(12) United States Patent
Kawashima et al.

(10) Patent No.: US 12,093,590 B2
(45) Date of Patent: Sep. 17, 2024

(54) CONTENT DISPLAY CONTROL APPARATUS AND CONTENT DISPLAY CONTROL METHOD

(71) Applicant: DENSO CORPORATION, Kariya (JP)

(72) Inventors: Daiki Kawashima, Kariya (JP); Shigeo Katoh, Kariya (JP); Kentaro Teshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 17/592,704

(22) Filed: Feb. 4, 2022

(65) Prior Publication Data

US 2022/0179608 A1 Jun. 9, 2022

Related U.S. Application Data

(63) Continuation of application No. PCT/JP2020/027677, filed on Jul. 16, 2020.

(30) Foreign Application Priority Data

Aug. 9, 2019 (JP) .................. 2019-147337

(51) Int. Cl.
| | |
|---|---|
| *G06F 3/14* | (2006.01) |
| *B60K 35/00* | (2006.01) |
| *B60K 35/22* | (2024.01) |
| *B60K 35/81* | (2024.01) |

(52) U.S. Cl.
CPC ............... *G06F 3/14* (2013.01); *B60K 35/00* (2013.01); *B60K 35/22* (2024.01); *B60K 35/81* (2024.01)

(58) Field of Classification Search
None
See application file for complete search history.

(56) References Cited

U.S. PATENT DOCUMENTS

| | | | | |
|---|---|---|---|---|
| 9,460,486 | B2* | 10/2016 | Ohba | ............... H04N 21/2662 |
| 2008/0260278 | A1* | 10/2008 | Zuo | .................. H04N 19/48 |
| | | | | 375/240.03 |
| 2014/0114531 | A1 | 4/2014 | Sugiyama et al. | |
| 2014/0152433 | A1 | 6/2014 | Sugiyama et al. | |
| 2014/0250395 | A1* | 9/2014 | Tanaka | .................... G06F 3/013 |
| | | | | 715/765 |
| 2016/0345681 | A1* | 12/2016 | Pheil | ..................... A43C 11/008 |
| 2017/0052634 | A1* | 2/2017 | Reeves | ................. G06F 3/1446 |

FOREIGN PATENT DOCUMENTS

JP 5742799 B2 7/2015

\* cited by examiner

*Primary Examiner* — Tapas Mazumder
(74) *Attorney, Agent, or Firm* — Harness, Dickey & Pierce, P.L.C.

(57) ABSTRACT

A content display control apparatus includes an animation rule definition storage unit configured to store animation rule definitions. The content display control apparatus is configured to arbitrate animations based on the animation rule definitions stored in the animation rule definition storage unit in response to receiving a screen transition arbitration result and an animation execution state, and to execute the animations according to the screen transition arbitration result and an animation arbitration result.

5 Claims, 23 Drawing Sheets

FIG. 9

```
Animation (1) ContentFadein_AfterOpening {
 AreaTransition{
  area: {area A, area B, area C, area D, area E}
  from:
  to : ANY_CONTENTS
  event:
  pattern: Fade
 }
 time: 1000[ms]
 wait:
 block:
 kickout: ContentFadeout_BeforeEnding
}

Animation (2) ContentFadeout_BeforeEnding {
 AreaTransition {
  area: {area A, area B, area C, area D, area E}
  from: ANY_CONTENTS
  to :
  event:
  pattern: Fade
 }
 time: 2000[ms]
 wait:
 block:
 kickout: ContentFadein_AfterOpening
}
```

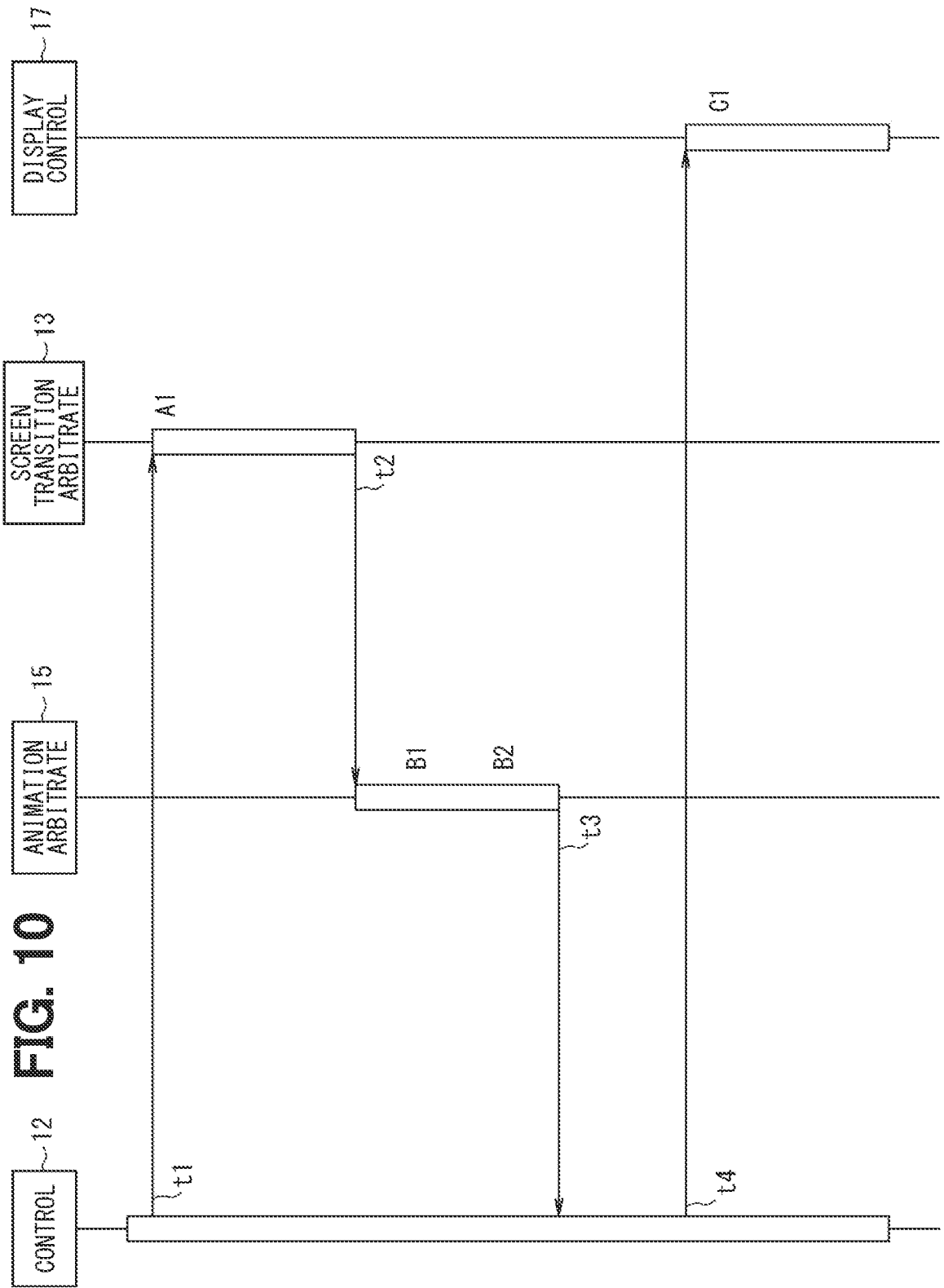

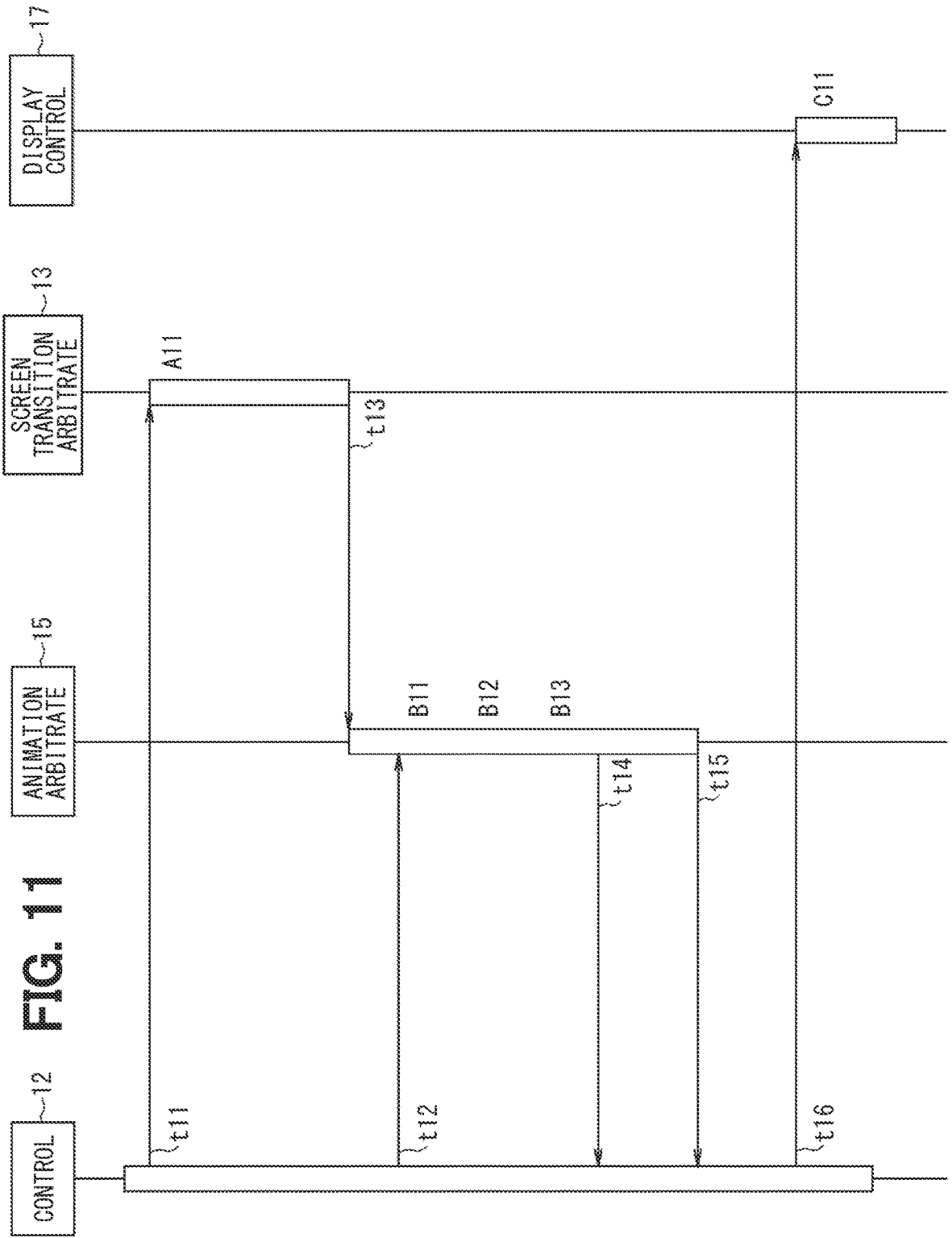

FIG. 15

| TRANSITION | TRANSITION POINT | ANIMATION TYPE | TRANSITION WHILE ANIMATION IS BEING EXECUTED |
|---|---|---|---|
| RING LEFT MOVE | (1) | SLIDE | PRIORITIZE ANIMATION BEING EXECUTED |
| RING RIGHT MOVE | (1)' | SLIDE | PRIORITIZE ANIMATION BEING EXECUTED |
| METER EXTINGUISH | (2) | FADEOUT | INTERRUPT TO CANCEL |

FIG. 16

```
・Animation Rule
//AnimationType
AnimationPattern Fade{}
AnimationPattern Slide{}
//(1)
Animation RingLeftMove{
 ContentMove{
  content:Ring
  from: RingCenterArea
  to: RingLeftsideArea
  pattern: Slide
 }
 wait: RingRightMove
}
//(1)'
Animation RingRightMove{
 ContentMove{
  content: Ring
  from: RingLeftsideArea
  to: RingCenterArea
  pattern: Slide
 }
 wait: RingLeftMove
}
//(2)
Animation MeterExtinguish{
 AreaTransition{
  area: FullScreen
  from: ANY_CONTENTS
  to:
  event:
  pattern: Fade
 }
 wait: RingLeftMove, RingRightMove
}
```

FIG. 23

| TRANSITION | TRANSITION POINT | ANIMATION TYPE | TRANSITION WHILE ANIMATION IS BEING EXECUTED |
|---|---|---|---|
| RING LEFT MOVE | (1) | SLIDE | PRIORITIZE ANIMATION BEING EXECUTED |
| RING RIGHT MOVE | (1)' | SLIDE | PRIORITIZE ANIMATION BEING EXECUTED |
| METER EXTINGUISH | (2) | FADEOUT | INTERRUPT TO CANCEL |

FIG. 24

```
·Animation Rule
//AnimationType
AnimationPattern Fade{}
AnimationPattern Slide{}
//(1)
Animation RingLeftMove{
 ContentMove{
  content: Ring
  from: RingCenterArea
  to: RingLeftsideArea
  pattern: Slide
 }
 wait:
 block: RingRightMove,MeterExtinguish
}
//(1)'
Animation RingRightMove{
 ContentMove{
  content: Ring
  from: RingLeftsideArea
  to: RingCenterArea
  pattern: Slide
 }
 wait:
 block: RingLeftMove,MeterExtinguish
}
//(2)
Animation MeterExtinguish{
 AreaTransition{
  area: FullScreen
  from: ANY_CONTENTS
  to:
  event:
  pattern: Fade
 }
 wait:
 block:
}
```

CONTENT DISPLAY CONTROL APPARATUS AND CONTENT DISPLAY CONTROL METHOD

CROSS REFERENCE TO RELATED APPLICATIONS

The present application is a continuation application of International Patent Application No. PCT/JP2020/027677 filed on Jul. 16, 2020, which designated the U.S. and claims the benefit of priority from Japanese Patent Application No. 2019-147337 filed on Aug. 9, 2019. The full disclosures of all of the above applications are incorporated herein by reference.

TECHNICAL FIELD

The present disclosure relates to a content display control apparatus and a content display control method.

BACKGROUND

For example, there are various kinds of contents displayed on a display device installed in a vehicle. Examples of such contents include a travel-related content that is related to a vehicle travel and a non-travel-related content that is not related to a vehicle travel. Examples of the travel-related content include a vehicle speed, an engine speed, a shift position, and a remaining amount of fuel. Examples of non-travel-related content include map information for navigation, audio information, and telephone information. A content is displayed in response to a display request of the content from an application. While a first content of a first application is being displayed, a display request of a second content may be generated from a second application. In such a case, the arbitration is performed as to which one of the first content and the second content is to be displayed with priority. For example, there is disclosed a method of arbitrating which content is to be displayed with priority.

In recent years, as the content display control has become complicated, the execution control of an animation in the screen transition has also become complicated. In a known method, it is necessary to determine an arbitration specification of how to behave when the next screen transition occurs during the execution of the animation. For example, it is necessary to determine (i) to continue to execute the previous animation as it is, skip the animation in the next screen transition and perform only the screen transition, or (ii) to wait for the animation in the next screen transition until the previous animation ends.

SUMMARY

According to an example of the present disclosure, a content display control apparatus is provided to include an animation rule definition storage unit configured to store animation rule definitions. The content display control apparatus is configured to arbitrate animations based on the animation rule definitions stored in the animation rule definition storage unit in response to receiving a screen transition arbitration result and an animation execution state, and to execute the animations according to the screen transition arbitration result and an animation arbitration result.

BRIEF DESCRIPTION OF DRAWINGS

The objects, features, and advantages of the present disclosure will become more apparent from the following detailed description made with reference to the accompanying drawings. In the drawings:

FIG. 9 is a diagram showing a rule definition of "kick out";

FIG. 10 is a diagram showing a sequence of processing for a new display;

FIG. 11 is a diagram showing a sequence of processing for interrupting and cancelling;

FIG. 15 is a diagram showing animation types and transitions during animation execution;

FIG. 16 is a diagram showing a rule definition of "wait";

FIG. 23 is a diagram showing animation types and transitions during animation execution; and FIG. 24 is a diagram showing a rule definition of "block".

DETAILED DESCRIPTION

Embodiment

Figure 2:
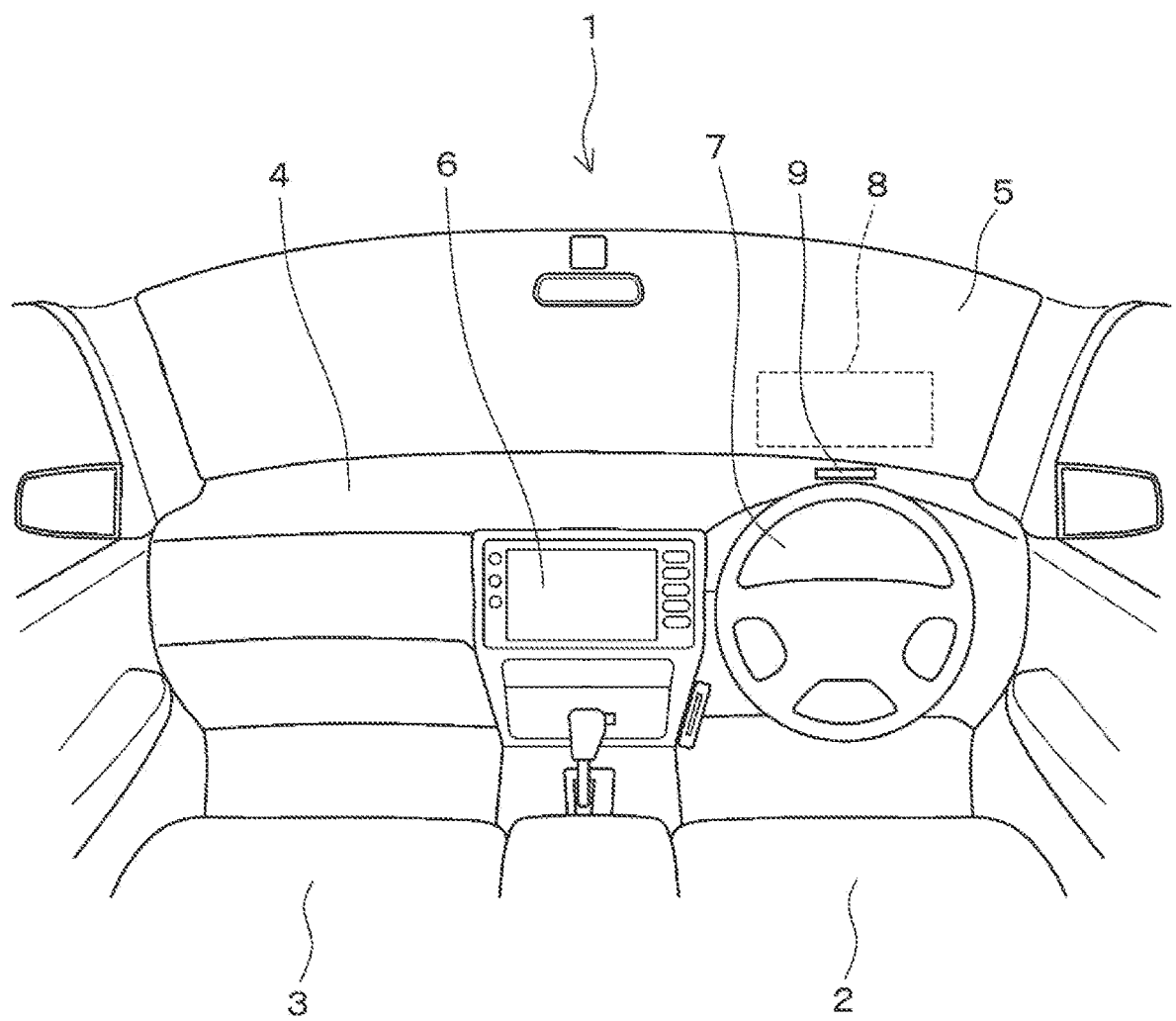
FIG. 2 is a perspective view showing a passenger compartment of a vehicle.

The following will describe an embodiment of the present disclosure with reference to the accompanying drawings. As shown in FIG. 2, a driver's seat 2 and a passenger seat 3 are arranged in the passenger compartment 1 of the vehicle, and an instrument panel 4 is arranged in front of the seats 2, 3. A windshield 5 is installed on the front end of the instrument panel 4 so as to stand up. A first display device 6 and a second display device 7 are arranged on the instrument panel 4, and a third display device 8 is arranged on the windshield 5.

The first display device 6 is, for example, a center display device composed of a full-color liquid crystal display device, and basically functions as a display device for displaying non-travel-related content that is a content not related to a vehicle travel. Non-travel-related content includes, for example, map information for navigation, audio information, telephone information, and the like. The first display device 6 also functions as a display device that displays an image of the rear of the vehicle captured by a rear camera when the vehicle is moving backward. The second display device 7 is, for example, a meter display device composed of a full-color liquid crystal display device, and basically functions as a display device for displaying a travel-related content that is a content related to a vehicle travel. The travel-related content is, for example, a vehicle speed, an engine speed, a shift position, a remaining amount of fuel, and the like. The third display device 8 is a head-up display in which an image is projected from a displaying unit 9 arranged on the instrument panel 4 onto the windshield 5. The third display device 8 basically functions as a display device for displaying the travel-related content, similar to the second display device 7. Each of the display devices 6 to 8 is set with one or more areas for displaying the contents. In such a configuration, by displaying the contents on each of the display devices 6 to 8, various information including the travel-related content and the non-travel-related content are presented to the occupant.

Figure 1:
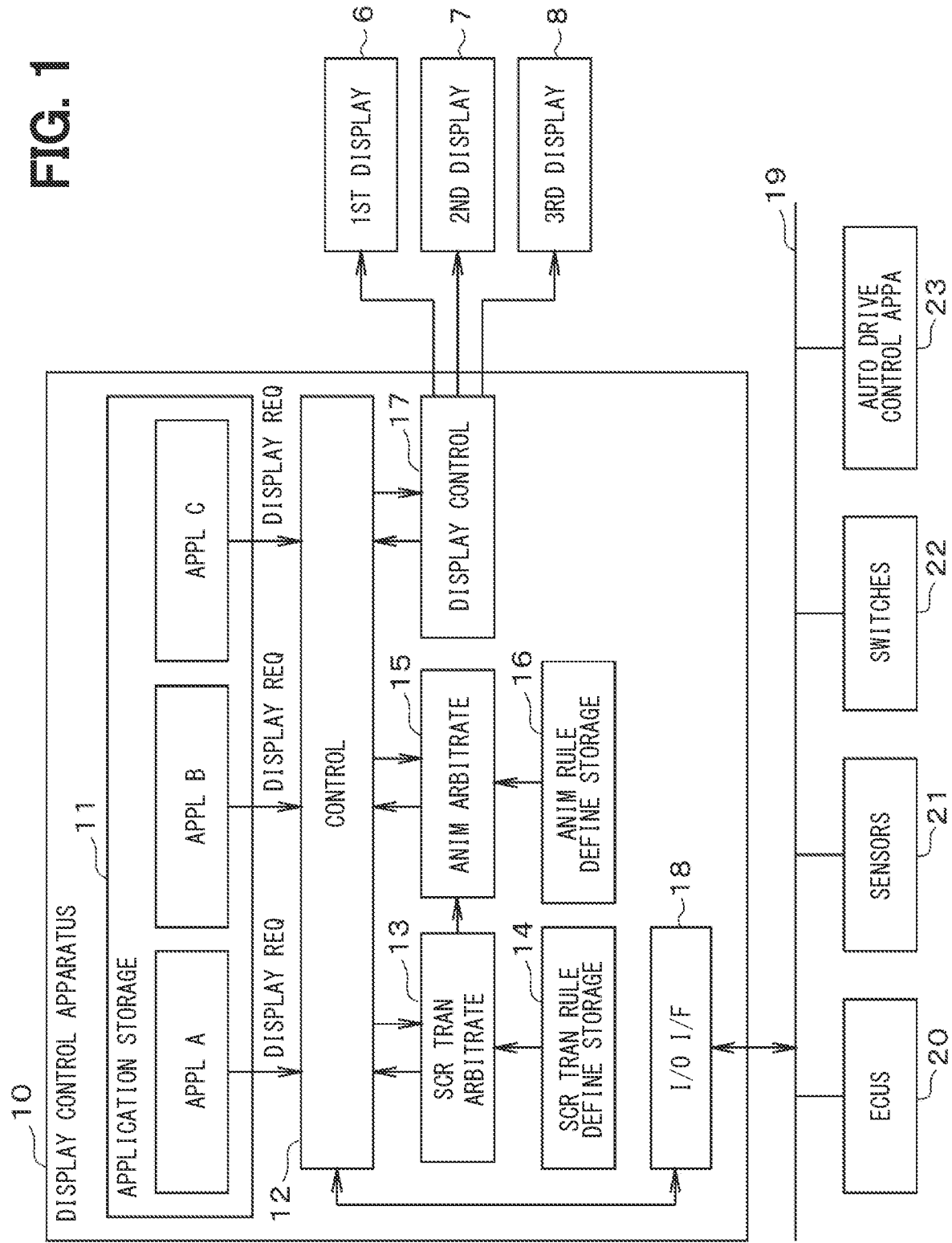
FIG. 1 is a functional block diagram showing a configuration of a display control apparatus according to an embodiment.

As shown in FIG. 1, the display control apparatus 10 (corresponding to a content display control apparatus) includes an application storage unit 11, a control unit 12 (corresponding to an execution instruction unit), a screen transition arbitration unit 13, a screen transition rule definition storage unit 14, an animation arbitration unit 15, an animation rule definition storage unit 16, a display control unit 17, and an input/output I/F 18. A plurality of applications A to C are stored in advance in the application storage unit 11. When one or more content display requests are generated, each of the applications A to C outputs, in an interruptive manner, a display request indicating a display target, an area indicating a display area, and content, to the control unit 12. The area is a region assigned when the content is displayed. Note that the application storage unit 11, the screen transition rule definition storage unit 14, and the animation rule definition storage unit 16 may be provided as respective storages or memories to be separate from each other, or may be provided as being fully or partially integrated into one or more storages or memories.

The control unit 12, the screen transition arbitration unit 13, the animation arbitration unit 15, and the display control unit 17 are each provided as a controller. Further, the control unit 12, the screen transition arbitration unit 13, the animation arbitration unit 15, and the display control unit 17 may be provided as one or more controllers. In the present embodiment, as an example, such a controller is implemented by including a microcomputer that includes a CPU (Central Processing Unit), a ROM (Read Only Memory), a RAM (Random Access Memory), and an I/O (Input/Output). The microcomputers execute a display control program stored in a non-transitory tangible storage medium, and control the operations of the display control apparatus 10.

The screen transition rule definition storage unit 14 stores screen transition rule definitions. The rule definition includes a constraint expression and an arbitration policy that defines basic arbitration when assigning a content to an area. The arbitration policy is always set by any of a priority arbitration, a second-win arbitration, and a value-based arbitration, as will be described later. The constraint expression is not limited to one. The constraint expression may not be provided or a plurality of constraint expressions may be provided depending on the intention of the writer.

Suppose a case where a display request is output in an interruptive manner from each application A to C to the control unit 12. In such a case, based on the screen transition rule definitions stored in the screen transition rule definition storage unit 14, the screen transition arbitration unit 13 arbitrates the contents assigned to the display areas and arbitrates the screen transitions. A plurality of display requests may be output in an interruptive manner from the respective applications concurrently. In this case, the screen transition arbitration unit 13 arbitrates which content is to be displayed with priority. "Concurrently" here does not mean the same time in time; instead, this means a state in which a content display request is generated from another application while one application is displaying the content, that is, a state in which a plurality of display requests have been output from the respective applications in an interruptive manner.

The animation arbitration unit 15 receives the arbitration result of the screen transitions from the screen transition arbitration unit 13, and receives the execution state of the animation from the display control unit 17. The animation arbitration unit 15 thereby arbitrates the animations based on the animation rule definitions stored in the animation rule definition storage unit 16. The animation arbitration will be described later.

The screen transition arbitration is performed by screen transition arbitration unit 13, and the animation arbitration is performed by the animation arbitration unit 15. Then, according to the arbitration result of the screen transitions and the arbitration result of the animations, the control unit 12 instructs the display control unit 17 to execute the animation. When the display control unit 17 is instructed to execute the animation by the control unit 12, the display control unit 17 follows the instruction as follows. That is, the content assigned by the screen transition arbitration is displayed in a predetermined area with the animation assigned by the animation arbitration, and the animation is executed. The input/output I/F 18 is connected to various ECUs 20, various sensors 21, various switches 22, an automatic driving control apparatus 23, and the like via an in-vehicle network 19. The in-vehicle network 19 is, for example, CAN (Controller Area Network) (registered trademark) or the like.

A. Rule-Based Arbitration and Arbitration Logic (1) Rule-based arbitration

A rule-based arbitration describes an arbitration method in which a content is arbitrated and assigned to an optional area based on a given fixed rule. Area definitions, content definitions, and constraint expressions are required as rule definitions in the rule-based arbitration.

(1-1) Area definition

An area definition defines a display location, a value of the display location, and an arbitration policy. Since an arbitration is performed for each area, an arbitration policy is defined for each area.

In the area, a frame for displaying a content on each of the display devices 6 to 8 is defined. Only one content is assigned to an area.

An area is defined as follows.

The area displays an assigned content.

The area has an arbitration policy.

The area refers to a content that can be displayed.

The area has one or more sizes.

Each area has a property. A priority, a Z-order, an arbitration policy, and a size are set to a property.

(a) Priority

The priority is a value (0 to 100%) indicating the value of an area itself. The arbitration is performed in order from the area with the highest priority value.

(b) Z-Order

The Z-order is a coordinate with respect to the height. The higher the Z-order value is, the closer to the front it is displayed. If there are areas with the same priority, the arbitration is performed in descending order of Z-order value.

(c) Arbitration Policy

The arbitration policy is one of a priority arbitration, a second-win arbitration, and a value-based arbitration.

(c-1) Priority Arbitration

Figure 3:
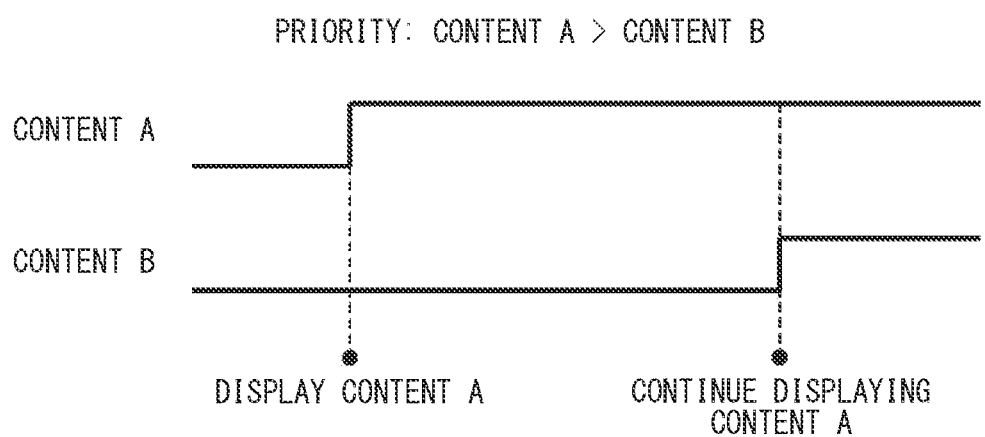
FIG. 3 is a diagram showing a priority arbitration.

The priority arbitration is an arbitration policy for each area. As shown in FIG. 3, the priority arbitration displays the content having the highest priority among the contents that can be displayed in the area.

(c-2) Second-Win Arbitration

Figure 4:
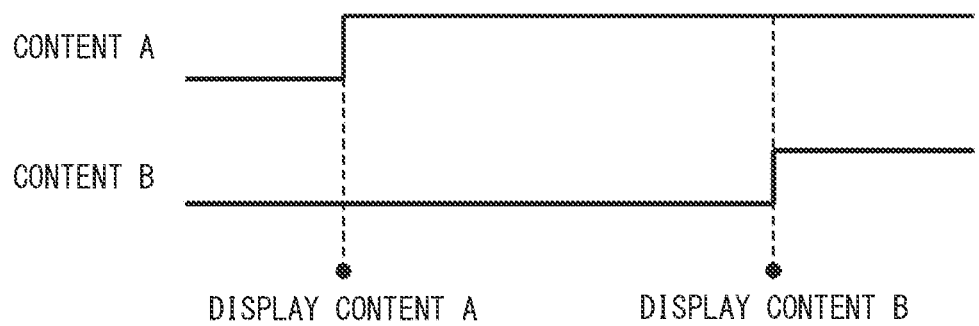
FIG. 4 is a diagram showing a second-win arbitration.

The second-win arbitration, which may also be referred to as a second-come-first-served arbitration, is an arbitration policy for each area. As shown in FIG. 4, the second-win arbitration displays the content of which the display request is issued last in an area. When the display of this last requested content is finished, the content of which the display request was issued last in the area among the remaining contents.

(c-3) Value-Based Arbitration

The value-based arbitration is an arbitration policy for the full area. The value-based arbitration displays the content that is the maximum among all the contents in the calculated value obtained by multiplying the numerical value that quantifies the value of the content and the numerical value that quantifies the value of the area.

(d) Size

Figure 5:
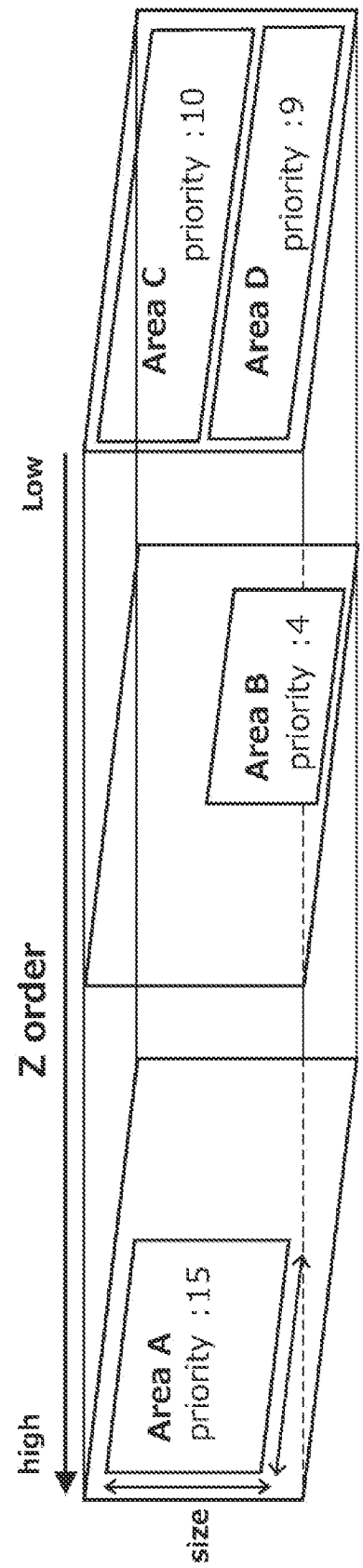
FIG. 5 is a diagram showing the relationship between the priority and the Z-order of an area.

The size is a size of the area, which is vertical×horizontal. If more than one size is defined, the size of the area is determined according to the size of the content. The relationship between the Z-order of the area and the priority is shown in FIG. 5.

(1-2) Content Definition

The content definition defines the displayable area, the state of the content, and the value of the state of the content. The content can have multiple states; the content is assigned to the area; and the content state is displayed. The content defines and refers to the area where the content itself can be displayed.

The content definition defines a content to be displayed in the area defined on the display screens of the display devices 6 to 8. Only one content is assigned to an area.

The content is defined as follows.

The content is assigned to an area.

The content refers to one or more areas where the content itself can be displayed.

The content always has one or more states.

The content has one or more sizes.

Figure 6:
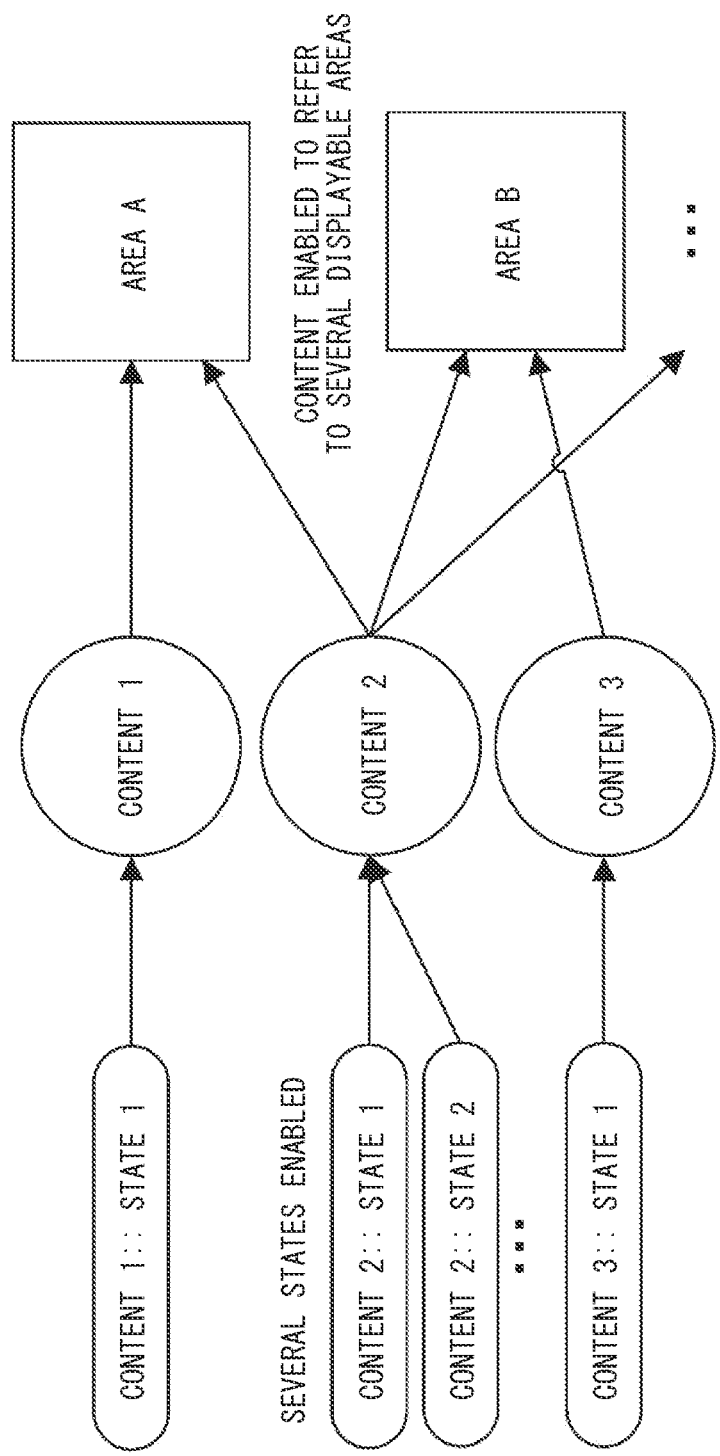
FIG. 6 is a diagram showing the relationship between contents, states, and areas.

Suppose that one content has a plurality of displayable areas. It indicates that (i) all of the displayable areas can display the one content, and (ii) the one content can be displayed in the plurality of displayable areas concurrently. One content can have multiple states. If one content has more than one state, each state is exclusive and can only be displayed in one state at a time. The content can have multiple sizes. If the content has multiple sizes, the closest size according to the size of the display destination area is displayed. The relationship between contents, states, and areas is linked as shown in FIG. 6.

The content has a property. The property is set with a priority, a size, and an attribute indicating whether the display request is withdrawn (cancelled) or not withdrawn (waiting) when the arbitration is lost.

(a) Priority

The priority is a value used when the arbitration policy of the area is "priority arbitration", and the content having a higher priority is assigned to the area first.

(b) Size

The size is a size of the display of the content and is vertical×horizontal. If more than one is defined, the size is determined according to the size of the area.

(1-3) Constraint Expression

The constraint expression is a rule that describes a property that must be exceptionally satisfied during or after arbitration. By suppressing the state of arbitration with the constraint expression, it is possible to express a state that cannot be expressed by the arbitration policy as it is, or to use it for determining the arbitration result after arbitration. That is, for example, depending on the situation such as the travel state of the vehicle, it may be better not to display even the content assigned by the arbitration policy. The constraint expression defines a condition for content suppression and/or area suppression, which are the conditions that the arbitration result must satisfy.

The logical expressions that can be handled by the constraint expression are the content state, the area state, the content displayed in the area, the set of the area and the content, the scene state, the logical operation, and the quantification symbol. The scene is, for example, a manual driving scene or an automatic driving scene by the automatic driving control apparatus 23; the display control is possible in which the content of the manual driving content group is not displayed in the automatic driving scene.

(a) The content state is either active/inactive or displayed/un-displayed.

(b) The state of the area is either displayed or un-displayed.

(c) The logical operations are NOT (!), AND, OR, implication (−>), and equal sign (=).

The quantification symbol includes ∀ (For all: the condition is satisfied for all elements of the set) and ∃ (Exists: at least one element satisfying the condition exists in the set).

(d) Constraint expression

The constraint expression affects the result of the arbitration logic, and the arbitration logic behaves to satisfy all constraints.

(1-4) Content Suppression

For example, "central area.displaying Content( )=c1−>! C2.is Visible( )" is exemplified as a constraint expression that the content c2 is not displayed while the content c1 is being displayed. This constraint expression describes the suppression that the content c2 is not displayed if the content c1 is displayed in the central area.

(1-5) Priority Arbitration and Second-Win Arbitration

When the priority arbitration and the second-win arbitration coexist, it is possible to deal with it by setting the arbitration policy of the area to second-win and describing only the relationship between the contents related to the priority with a constraint expression.

Such a constraint expression, "telephone.is Active( )−> For All MM interrupt (other than telephone) {x|! X.is Visible( )}" is exemplified. The above describes the suppression in which although the arbitration policy for the area is a second-win arbitration, adding this constraint expression prevents all multimedia interrupts (other than the telephone) from being displayed if the high-priority content of the telephone is active.

(2) Arbitration Logic

The arbitration logic is an algorithm that defines how to assign a content to satisfy a constraint expression based on an area arbitration policy based on a given rule. Basically, the arbitration is performed in order of priority for each area. The arbitration logic includes an arbitration within an area and an arbitration for a full area.

(2-1) Arbitration within Area
 (a) An arbitration within an area arbitrates an area for the priority arbitration and the second-win arbitration in descending order of priority.
 (b) Each area is evaluated as follows.

The highest priority content is temporarily assigned. If the evaluation result of the constraint expression is TRUE, the temporarily assigned content is determined. If the evaluation result of the constraint expression is FALSE, the second highest priority content is temporarily assigned and evaluated. When there is no content satisfying the constraint expression, any content is not displayed in the that area.

(2-2) Arbitration of Full Area

Arbitration (value-based arbitration) of a full area includes a best fit logic and a one-pass logic.
 (a) The best fit logic selects one combination with the highest total value from all combinations of the content and the area that satisfy the constraint equation.
 (b) The one-pass logic assigns the content with the higher priority to the area in order from the area with the higher priority, and excludes the content already assigned to the other area. In this embodiment, the one-pass logic is adopted, but the best fit logic may be adopted.

B. Rule-Based Animation Definition Method, Animation Information Generation, Animation Interference Arbitration Logic In the past, arbitration specifications for animations have been designed and managed using matrix tables and state transition diagrams. However, such a method of designing and managing the arbitration specifications for animations using matrix tables and state transition diagrams makes it difficult to flexibly respond to changes in contents and animation patterns. Further, even if the arbitration specifications can be managed, there is a risk that an error may occur when implementing the arbitration specifications. Under these circumstances, a method that can easily manage the execution control of animations is desired. In this embodiment, the following configuration is adopted.

The animation rule definition stored in the animation rule definition storage unit 16 described above can define what kind of transition is made, which animation pattern is used, and what rules are used to arbitrate the animations when screen transitions interfere with each other. The animation arbitration unit 15 arbitrates the animation based on the rule definition of the animation, and determines the animation to be executed. The following will describe a rule-based animation definition method, an animation information generation, and an animation interference arbitration logic.

(1) Rule-Based Animation Definition Method

There are two types of animations: an inter-area movement animation and an intra-area transition animation. The inter-area movement animation defines a movement source area, a movement destination area, and a target content as transition conditions. The intra-area transition animation defines a transition source content, a transition destination content, and a target area as transition conditions. An animation has basic constituent elements that are defined as an animation pattern (fade, slide, etc.) and an animation execution time. This information is information for notifying the other party (display device, etc.), which is notified of the arbitration result, of what kind of animation it is.

Furthermore, as options, a target event can be specified, and an animation constraint expression can be defined. When an animation occurs triggered by an event (switch operation detection, etc.), such a target event is defined. If it is preferable to cancel a specific animation based on the state of the area or content, an animation constraint expression is defined.

When a first animation is interfered by a second animation serving as an interfering party, it is possible to specify the behavior of the interfering party's animation or the interfered party's animation. There are three types of behaviors: "kickout" that cancels the second animation of the interfering party, "block" that makes the second animation of the interfering party wait, and "wait" that executes the second animation of the interfering party and makes the first animation of the interfered party wait.

(2) Generation of Animation Information

Difference information is generated in the combination of the display area and content between the previous arbitration result and the current arbitration result. Animation information is generated when the generated difference information matches the transition condition defined in the animation rule. The generated animation information is registered in the action queue (a list that manages execution animations including the past arbitrations). In this case, if there is animation information previously registered in the action queue, the animation interference is arbitrated according to the arbitration rule.

(3) Arbitration Logic of Animation Interference

First, the animation constraint expression is evaluated and whether to cancel the registered animation is checked from the arbitration result. Next, the "wait" interference is checked between the new animation and the registered animation, and whether the new animation can be executed is checked. Next, the "block" interference is checked between the new animation and the registered animation, and whether to make the new animation wait is checked. Finally, "kickout" interference is checked between the new animation and the registered animation, and whether to cancel the registered animation is checked. When the interference check is completed, the new animation is ready to be executed, and if it is not in the "wait" state, the arbitration logic instructs the execution of the new animation.

Figure 7:
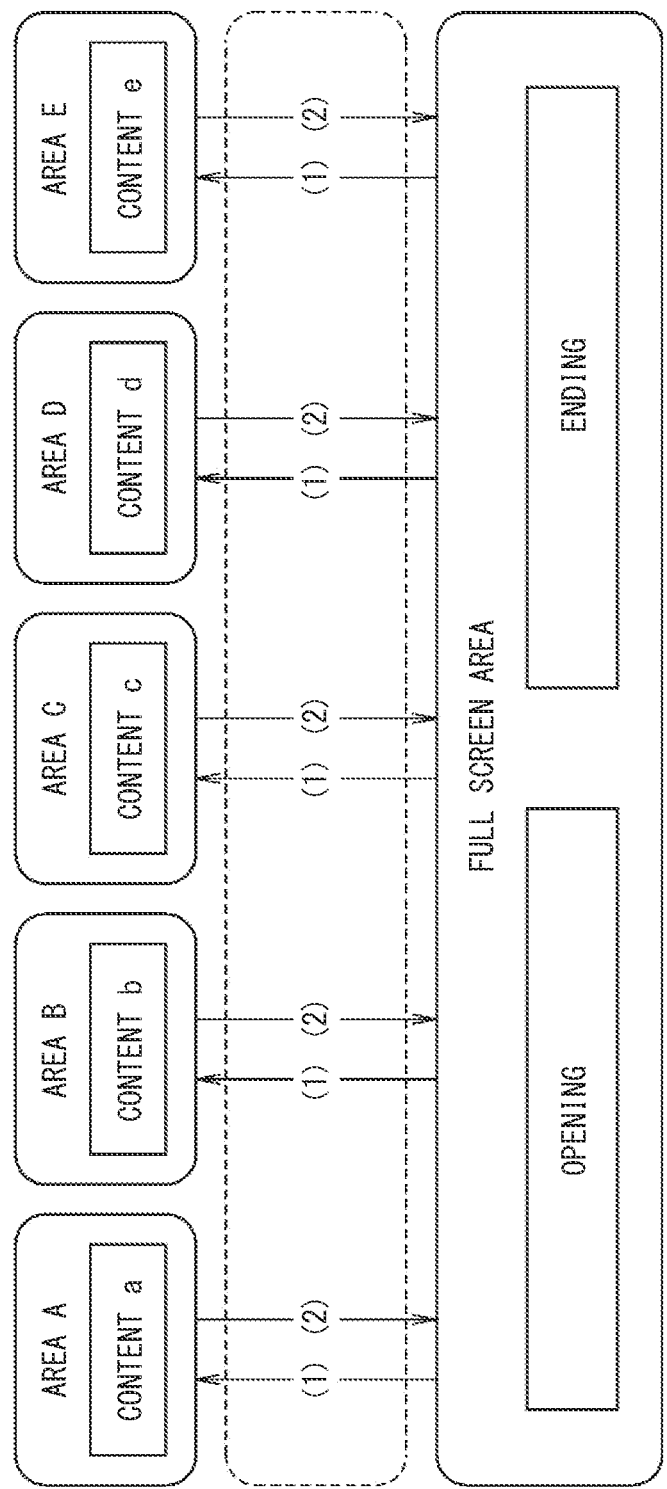
FIG. 7 is a diagram showing examples of fade-in and fade-out.
Figure 8:
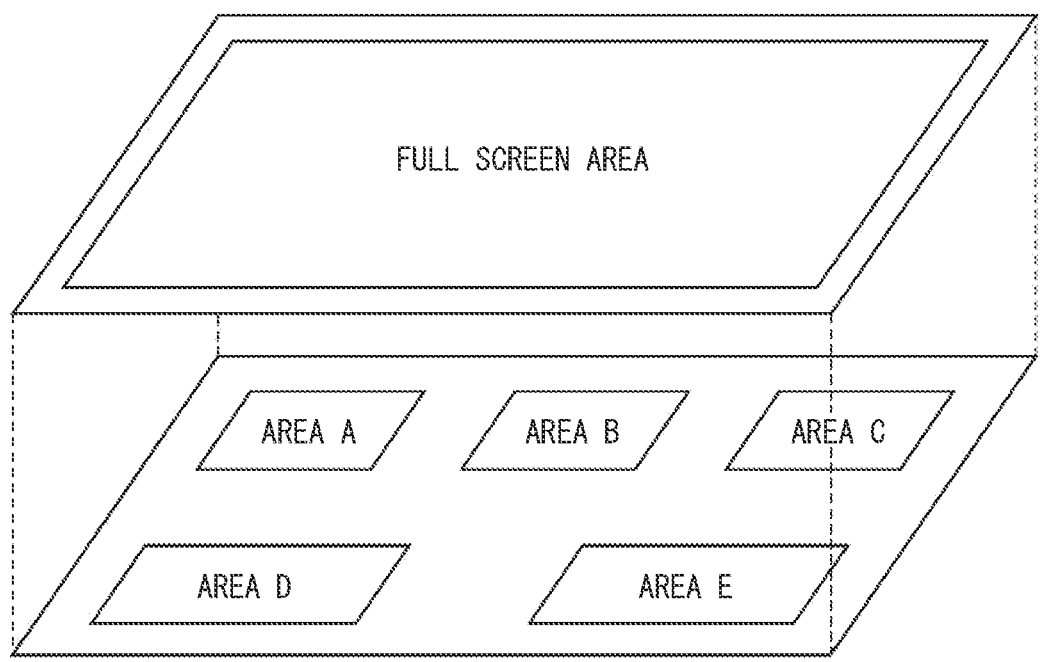
FIG. 8 is a diagram showing a layer structure of areas.

C. "Kickout" Interference, "Wait" Interference, and "Block" Interference (1) "Kickout" Interference "Kickout" interference will be described with reference to FIGS. 7 to 11. As shown in FIG. 7, for example, with respect to the full screen area, a fade-in when the contents a to e are displayed in the areas A to E and a fade-out when the contents are erased will be described. As shown in FIG. 8, when a content is assigned to the full screen area, the areas A to E in the layer lower than the full screen area are hidden.

Areas A to E and contents a toe can be defined as shown in FIG. 9 as an example of the rule definition of "kickout" interference. FIG. 9 illustrates a specification in which the content fades in after the opening and a specification in which the content fades out before the ending. In a known method of designing and managing state transition diagrams, it was necessary to specify all areas A to E, all contents a to e, and their transitions. However, in the rule-based method, the content can be specified by a simplified display such as "ANY_CONTENT". In FIG. 9, the target area is specified by "area:", the transition source content is specified by "from:", and the transition destination content is specified by "to:". As the sequence of the arbitration logic, new display and interrupt cancellation will be described in order.

(1-1) New Display

The new display will be described with reference to FIG. 10. The prerequisites and situations are as follows.

Prerequisite: There is WindowInt area that is blank.

Situation: Outputting a display request of a clearance sonar door open content and displaying the clearance sonar door open content with a fade animation.

When a display request for a clearance sonar door open content is received from an application, the control unit 12 outputs an ON request for the clearance sonar door open to the screen transition arbitration unit 13 (t1). When the ON request for the clearance sonar door open is received from the control unit 12, the screen transition arbitration unit 13 determines that the clearance sonar door open content can be assigned to the WindowInt area (A1). The screen transition arbitration unit 13 outputs the arbitration result to the animation arbitration unit 15, and notifies the animation arbitration unit 15 of displaying the clearance sonar door open content newly in the WindowInt area (t2).

When the arbitration result is received from the screen transition arbitration unit 13, the animation arbitration unit 15 performs an interference check based on the animation rule definition stored in the animation rule definition storage unit 16 (B1, corresponding to an animation arbitration step and an animation arbitration processing). Here, the animation arbitration unit 15 determines that the interrupt display animation can be executed because nothing is displayed in the WindowInt area as the prerequisite (B2). The animation arbitration unit 15 outputs the animation arbitration result to the control unit 12, and notifies the control unit 12 of displaying the clearance sonar door open content newly in the WindowInt area by a fade animation (t3).

When the animation arbitration result is received from the animation arbitration unit 15, the control unit 12 outputs a new display animation instruction for the clearance sonar door open content to the display control unit 17 according to the received animation arbitration result (t4, corresponding to an execution instruction step and an execution instruction processing). When the new display animation instruction for the clearance sonar door open content is received from the control unit 12, the display control unit 17 executes a new display animation for the clearance sonar door open content according to the received new display animation instruction, and newly displays the clearance sonar door open content (C1).

(1-2) Interrupt Cancellation

An interrupt cancellation will be described with reference to FIG. 11. The prerequisites and situations are as follows.

Prerequisite: There is WindowInt area to which the clearance sonar Door Open Content has been assigned. A new display animation for the clearance sonar door open content is being executed.

Situation: Withdrawing the display request for the clearance sonar door open content, and cancelling the fade-in animation while hiding the clearance sonar door open content with the fade-out animation.

When a non-display request for the clearance sonar door open content is received from the application, the control unit 12 outputs an OFF request for the clearance sonar door open to the screen transition arbitration unit 13 (t11). After that, the control unit 12 outputs a registration request for the animation to the animation arbitration unit 15 (t12). When the OFF request for the clearance sonar door open is received from the control unit 12, the screen transition arbitration unit 13 determines that there is no content assigned in the WindowInt area (A11), outputs the arbitration result to the animation arbitration unit 15, and notifies the animation arbitration unit 15 of deleting the clearance sonar door open content from the WindowInt area (t13).

When the arbitration result is received from the screen transition arbitration unit 13 and the registration request for the animation is received from the control unit 12, the animation arbitration unit 15 performs an interference check based on the animation rule definition stored in the animation rule definition storage unit 16 (B11, corresponding to an animation arbitration step and an animation arbitration processing). Here, the animation arbitration unit 15 determines that the interrupt display animation being executed is canceled (B12), and determines that the interrupt non-display animation can be executed (B13). The animation arbitration unit 15 outputs the first animation arbitration result to the control unit 12, and notifies the control unit 12 of cancelling the new display animation for the clearance sonar door open content (t14). After that, the animation arbitration unit 15 outputs the second animation arbitration result to the control unit 12, and notifies the control unit 12 of withdrawal display of the clearance sonar door open content from the WindowInt area by the fade animation (t15).

When the first animation arbitration result and the second animation arbitration result are received from the animation arbitration unit 15, the control unit 12 outputs the cancellation instruction of the new display animation for the clearance sonar door open content and the non-display animation instruction of the clearance sonar door open content to the display control unit 17 according to the received first animation arbitration result and second animation arbitration result (t16, corresponding to an execution instruction step and an execution instruction processing). When the cancellation instruction of the new display animation for the clearance sonar door open content and the non-display animation instruction of the clearance sonar door open content are received from the control unit 12, the display control unit 17 cancels the new display animation for the clearance sonar door open content according to the received instruction and executes the non-display animation for the clearance sonar door open content (C11).

(2) "Wait" Interference

Figure 12:
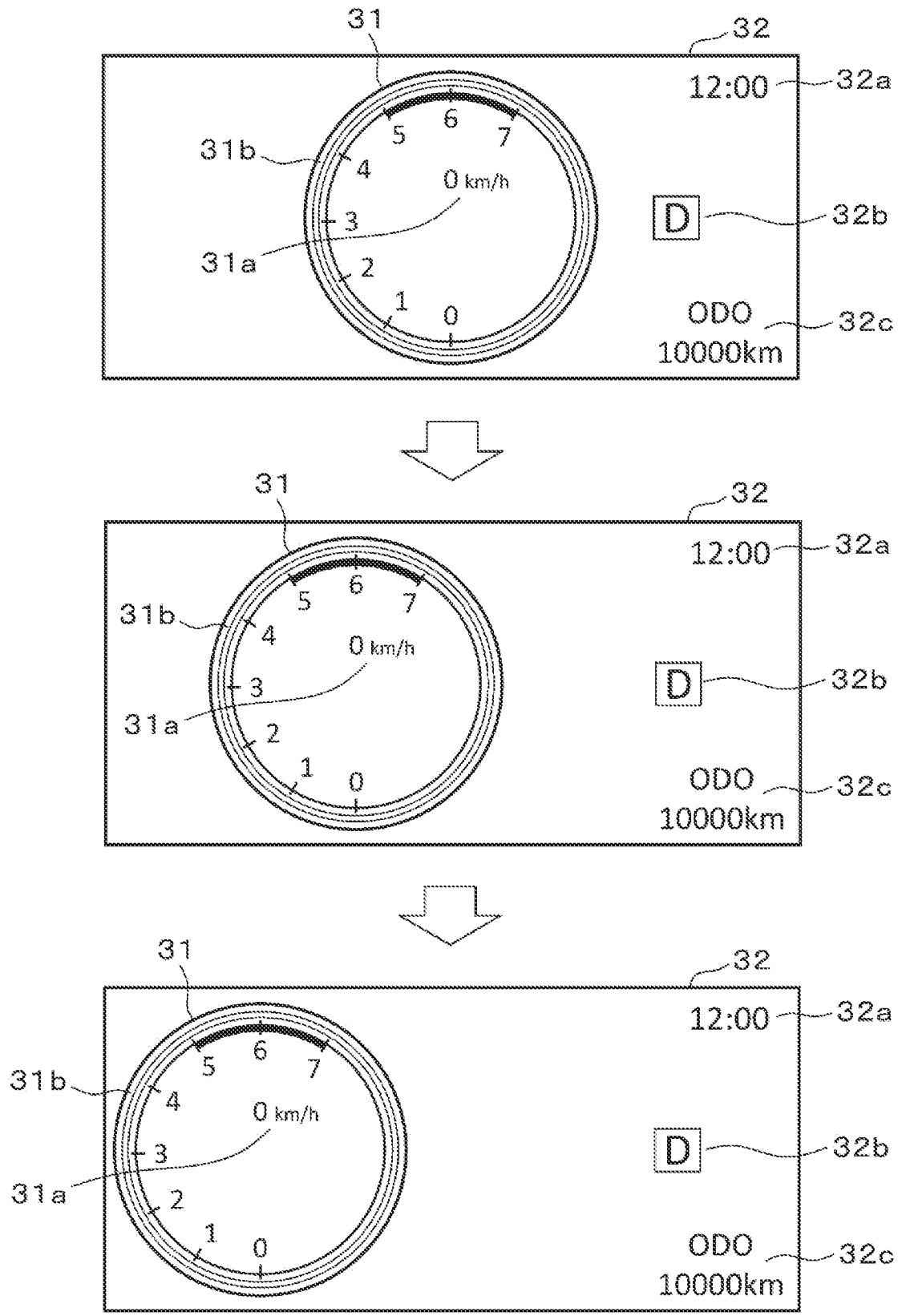
FIG. 12 is a diagram showing a left moving animation of a ring content.
Figure 13:
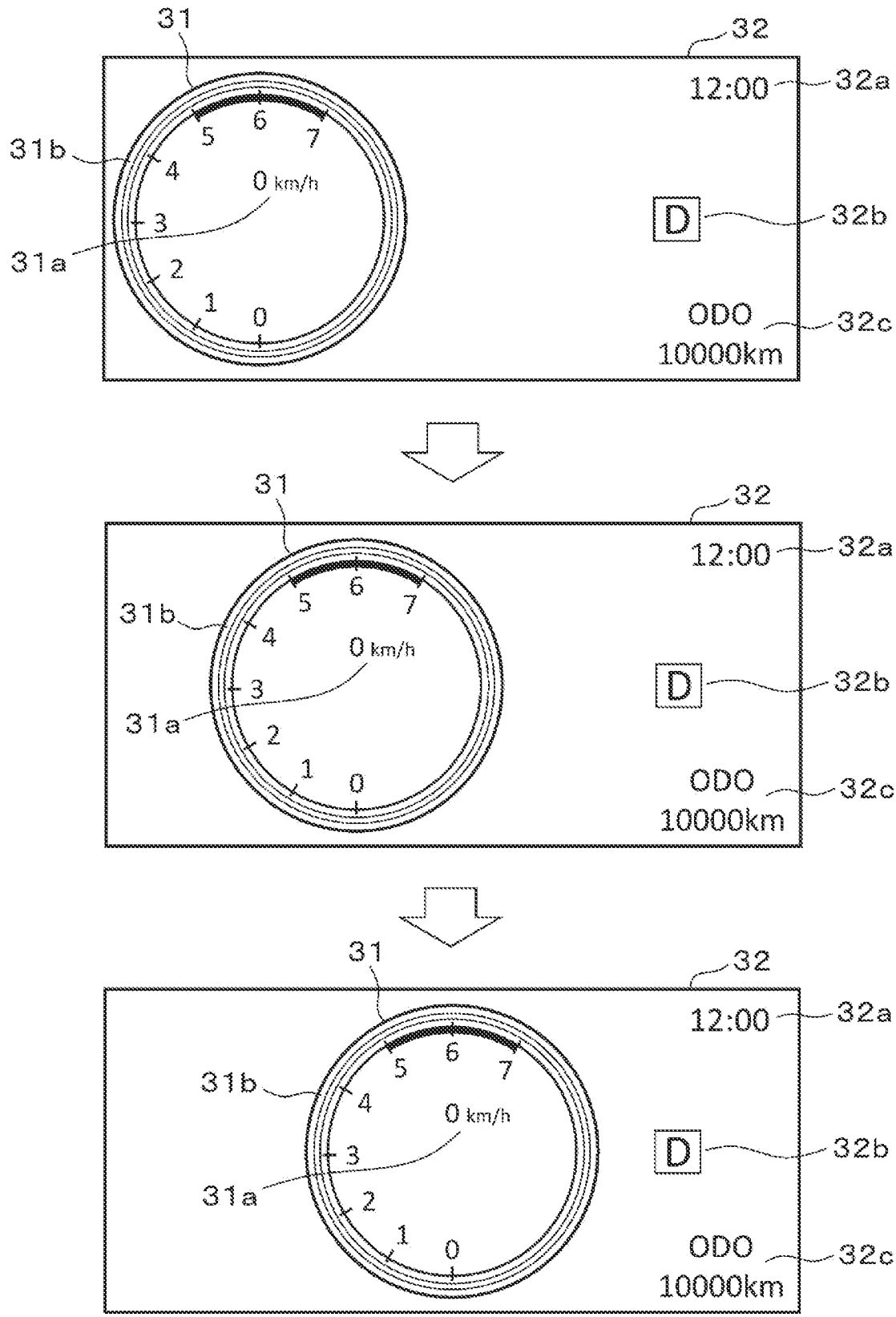
FIG. 13 is a diagram showing a right moving animation of a ring content.
Figure 14:
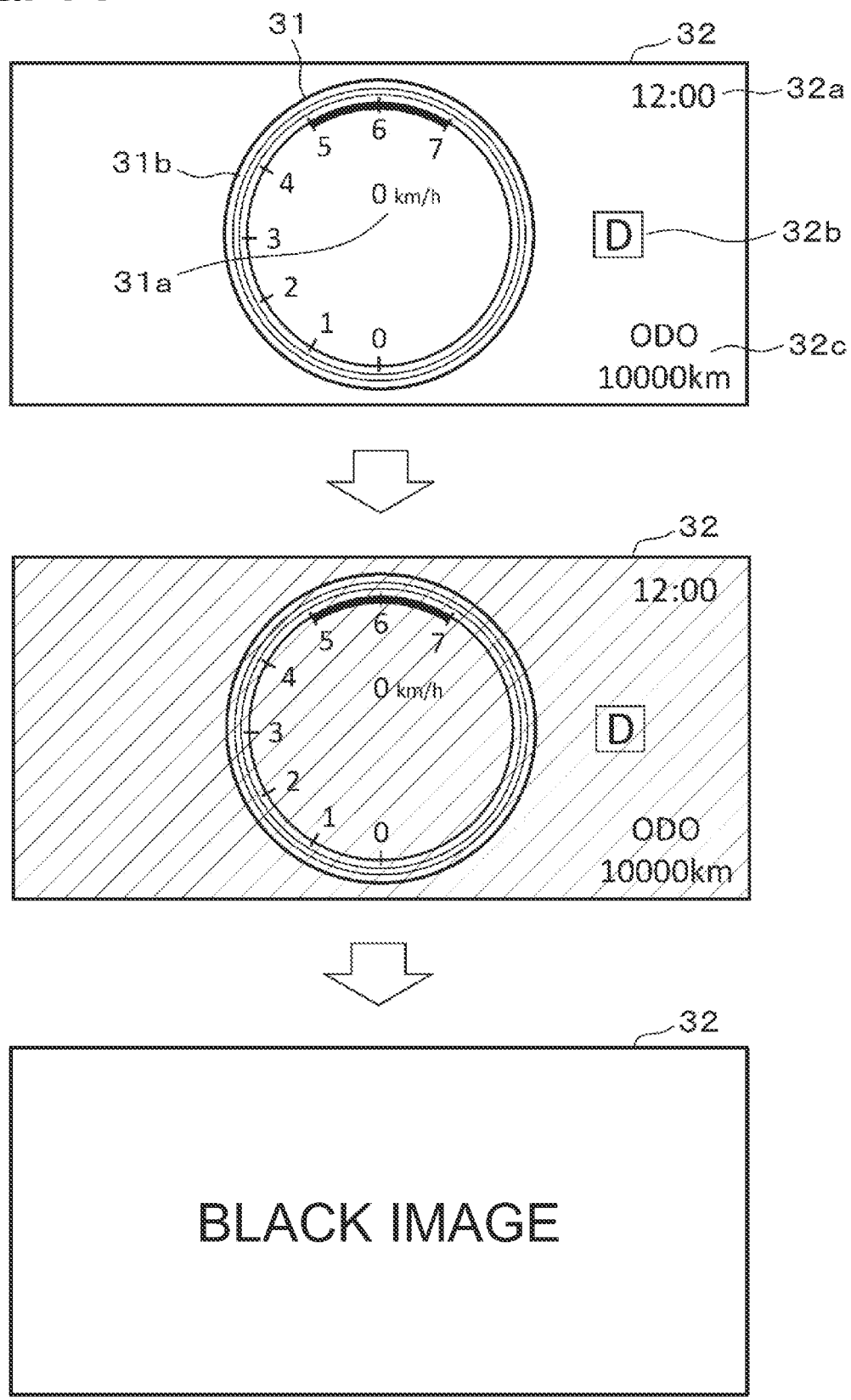
FIG. 14 is a diagram showing a meter extinguishing animation.

"Wait" interference will be described with reference to FIGS. 12 to 22. "Wait" interference is a rule definition that defines the specification of "wait", and is a rule definition that makes its own animation wait when the animation specified by "wait" is being executed. Hereinafter, a ring left movement animation, a ring right movement animation, and a meter extinguishing animation will be described as examples. As shown in FIG. 12, the ring left movement animation is an animation showing an mode when a ring content 31 is moved to the left in the displayable area 32 for the ring content 31. As shown in FIG. 13, the ring right movement animation is an animation showing an mode when the ring content 31 is moved to the right in the displayable area 32 for the ring content 31. As shown in FIG. 14, the meter extinguishing animation is an animation showing an mode when the meter area, which is the displayable area 32 for the ring content 31, is extinguished. The black image shown in FIG. 14 indicates a light-off state. The ring content 31 includes a vehicle speed display unit 31a for displaying a vehicle speed and a circumferential engine speed display unit 31b for displaying an engine speed. Further, the displayable area 32 of the ring content 31 includes a time display unit 32*a* for displaying the time, a shift position display unit 32*b* for displaying a shift position, and a travel total distance display unit 32*c* for displaying a travel total distance.

The ring left movement animation, the ring right movement animation, and the meter extinguishing animation can be defined as shown in FIG. 15 as examples of animation types and transitions during animation execution. An example of a "wait" interference rule definition can be defined as shown in FIG. 16. In FIG. 16, in the ring left movement animation and the ring right movement animation, which are inter-area movement animations, a target content is specified with "content:", a movement source area is specified with "from:", and a movement destination area is specified with "to:". In this case, the ring left movement animation and the ring right movement animation specify the animation type "slide". Also, in the meter extinguishing animation which is the transition animation in the area, a target area is specified with "area:", a transition source content is specified with "from:", and a transition destination content is specified with "to:". In this case, the meter extinguishing animation specifies the animation type "fade out". Also, the ring left movement specifies "wait: ring right move", the ring right movement specifies "wait: ring left move", and the meter extinguishing specifies "wait: ring left move, ring right move". As the sequence of the arbitration logic, a movement animation, waiting and execution of an interrupt animation, and stacking of the waiting animation will be described in order.

(2-1) Movement Animation

The movement animation will be described with reference to FIG. 17. The prerequisites and situations are as follows.

Prerequisite: Ring content 31 is being displayed in a ring center area.

Situation: Displaying an animation of ring movement.

When the user operates a steering switch indicating the left direction and the operation detection of the steering switch indicating the left direction is received from the application, the control unit 12 outputs the operation detection of the steering switch indicating the left direction to the screen transition arbitration unit 13 (t21). When the operation detection of the steering switch indicating the left direction is received from the control unit 12, the screen transition arbitration unit 13 determines that the ring content 31 can be assigned to the ring side area (A21), outputs the arbitration result to the animation arbitration unit 15, and notifies the animation arbitration unit 15 that the ring content 31 is moved from the ring center area to the ring side area (t22).

When the arbitration result is received from the screen transition arbitration unit 13, the animation arbitration unit 15 determines that the ring content 31 can be moved to the left (B21, corresponding to an animation arbitration step and an animation arbitration processing). The animation arbitration unit 15 then outputs the animation arbitration result to the control unit 12, and notifies the control unit 12 that the ring content 31 is moved from the ring center area to the ring side area by a slide animation (t23).

When the animation arbitration result is received from the animation arbitration unit 15, the control unit 12 outputs the left movement animation instruction of the ring content 31 to the display control unit 17 according to the received animation arbitration result (t24, corresponding to an execution instruction step and an execution instruction processing). When the left movement animation instruction of the ring content 31 is received from the control unit 12, the display control unit 17 executes the left movement animation for the ring content 31 according to the received instruction and moves the ring content 31 to the left (C21).

(2-2) Waiting and Executing of Interrupt Animation

Figure 18:
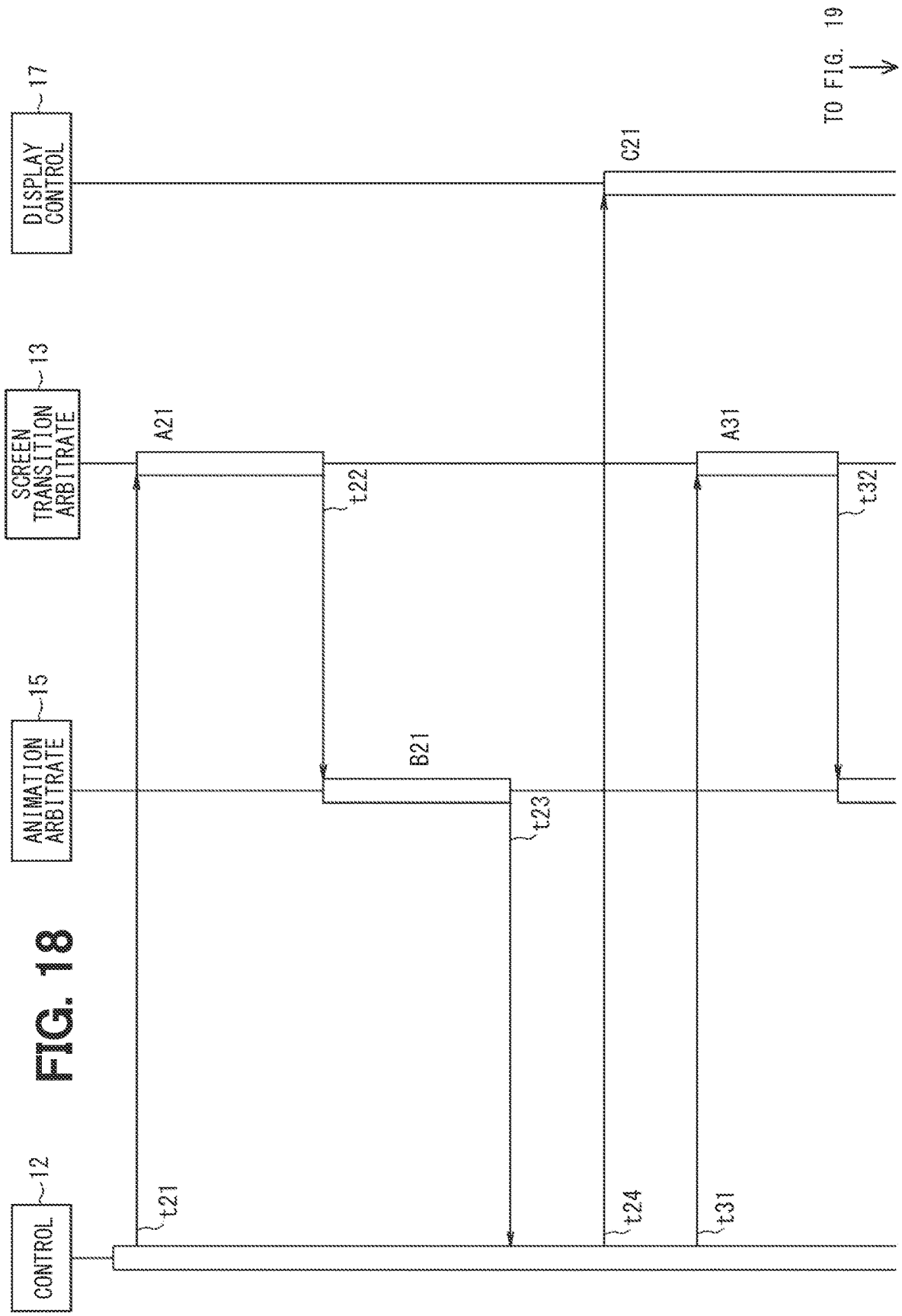
FIG. 18 is a diagram (No. 1) showing a sequence of processing for waiting and executing of an interrupt animation.
Figure 19:
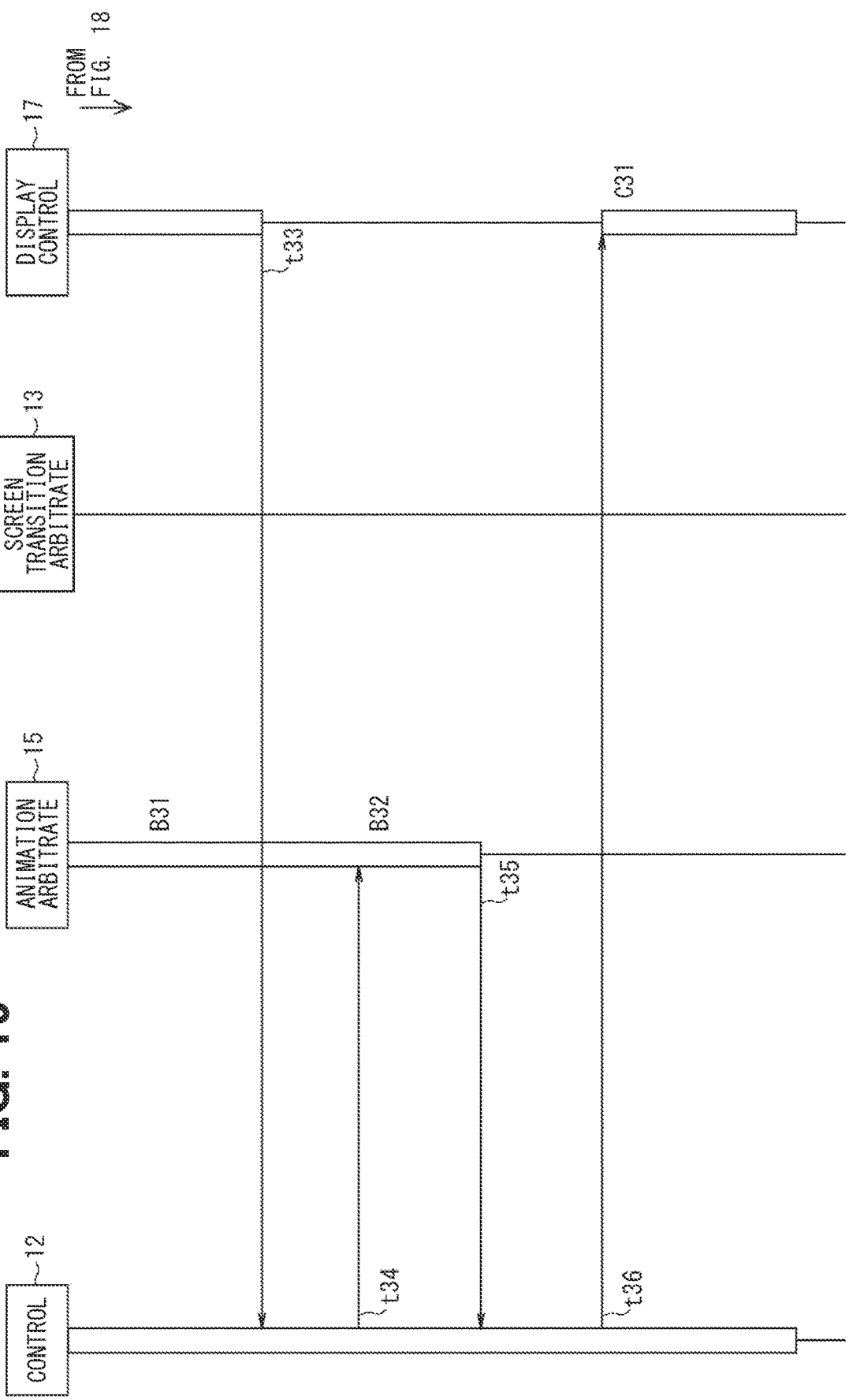
FIG. 19 is a diagram (No. 2) showing a sequence of processing for waiting and executing of an interrupt animation.

The waiting and executing of an interrupt animation will be described with reference to FIG. 18 and FIG. 19. The prerequisites and situations are as follows.

Prerequisite: Ring content 31 is being displayed in the ring center area.

Situation: Even if the right movement animation occurs while the left movement animation of the ring content 31 is being executed, the former animation is prioritized and the latter animation is made to wait. After the animation that caused the wait is finished, the wait animation is executed.

Figure 17:
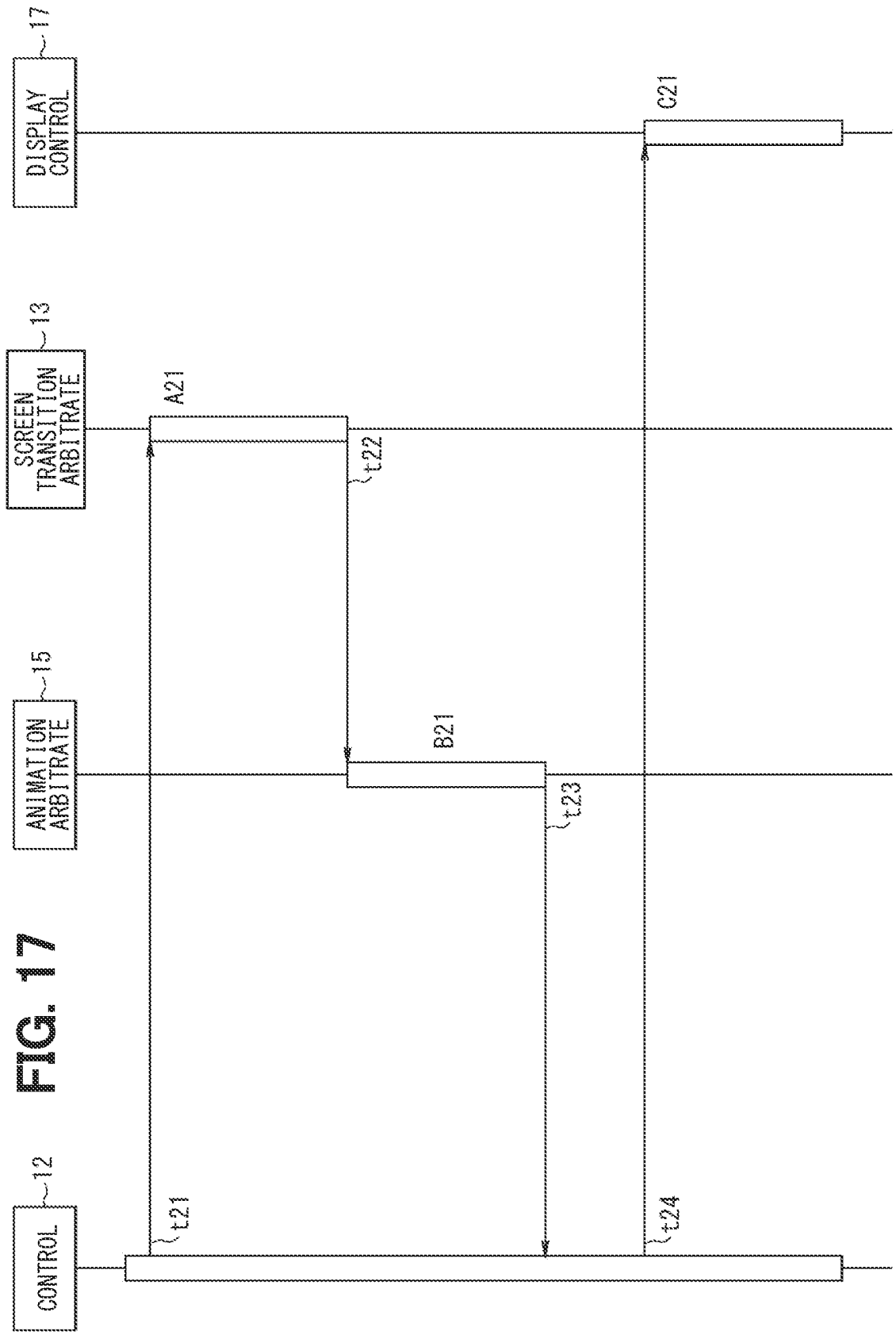
FIG. 17 is a diagram showing a sequence of processing for moving an animation.

As described in FIG. 17 above, while the display control unit 17 is executing the left movement animation of the ring content 31, the user operates the steering switch indicating the right direction, and the control unit 12 receives the operation detection of the steering switch indicating the right direction from the application. Then, the control unit 12 outputs the operation detection of the steering switch indicating the right direction to the screen transition arbitration unit 13 (t31). When the operation detection of the steering switch instructed to the right is received from the control unit 12, the screen transition arbitration unit 13 determines that the ring content 31 can be assigned to the center area (A31). The screen transition arbitration unit 13 then outputs the arbitration result to the animation arbitration unit 15, and notifies the animation arbitration unit 15 that the ring content 31 is moved from the ring side area to the ring center area (t32).

When the arbitration result is received from the screen transition arbitration unit 13, the animation arbitration unit 15 determines that the ring content 31 is waiting for the right movement because the left movement animation for the ring content 31 is being executed (B31, corresponding to an animation arbitration step and an animation arbitration processing).

When the display control unit 17 ends the left movement animation for the ring content 31, the display control unit 17 outputs an animation end notification to the control unit 12 (t33). When the animation end notification is received from the display control unit 17, the control unit 12 outputs the animation end notification to the animation arbitration unit 15 (t34). When the animation end notification is received from the control unit 12, the animation arbitration unit 15 determines that the ring content 31 can be moved to the right (B32, corresponding to an animation arbitration step and an animation arbitration processing). The animation arbitration unit 15 then outputs the animation arbitration result to the control unit 12, and notified the control unit 12 that the ring content 31 is moved from the ring side area to the ring center area by a slide animation (t35).

When the animation arbitration result is received from the animation arbitration unit 15, the control unit 12 outputs a right movement animation instruction of the ring content 31 to the display control unit 17 according to the received animation arbitration result (t36, corresponding to an execution instruction step and an execution instruction processing). When the right movement animation instruction of the ring content 31 is received from the control unit 12, the display control unit 17 executes the right movement animation for the ring content 31 according to the received right movement animation instruction, and moves the ring content 31 to the right (C31).

(2-3) Stacking Waiting Animations

Figure 20:
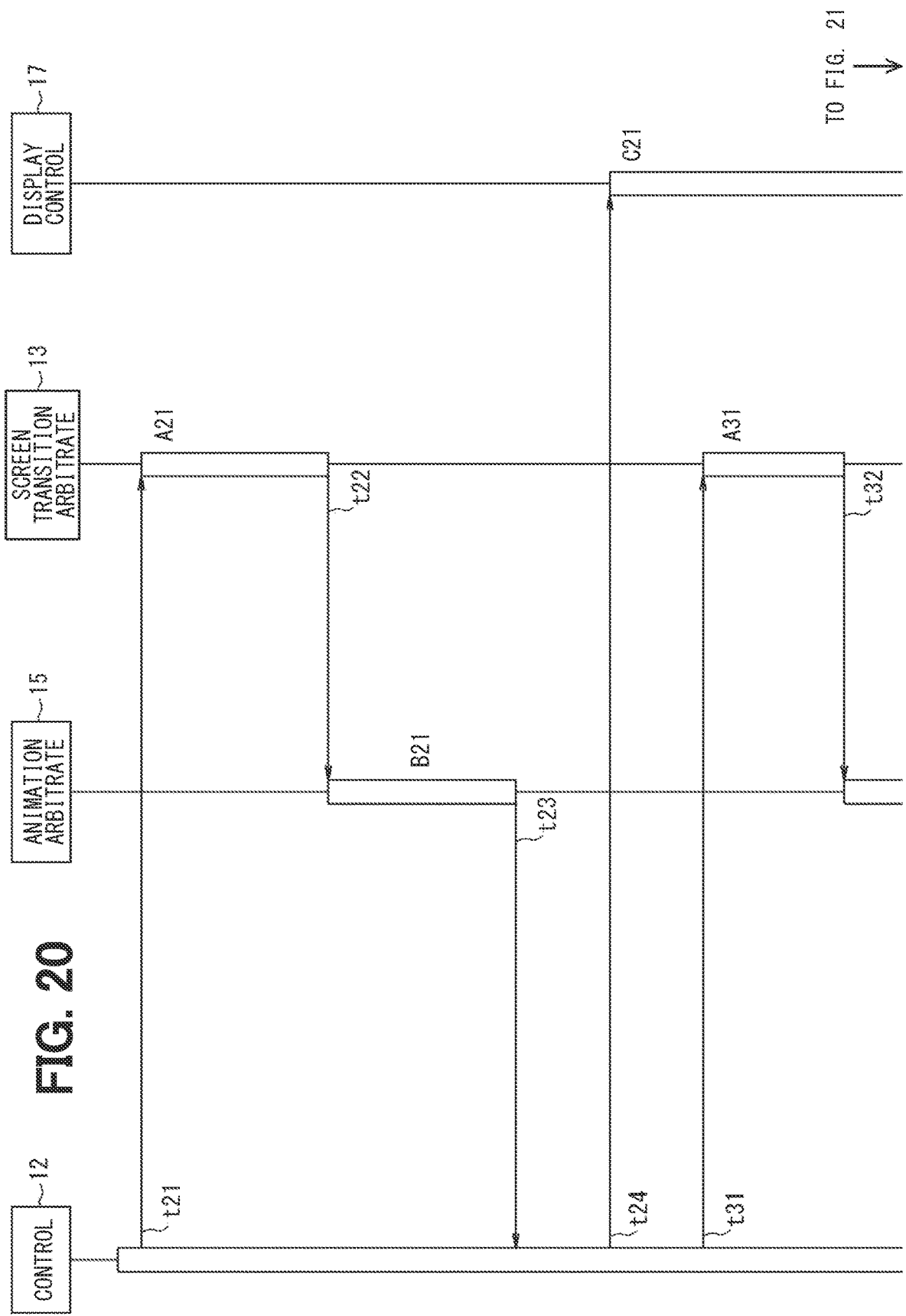
FIG. 20 is a diagram (No. 1) showing a sequence of processing for stacking waiting animations.
Figure 21:
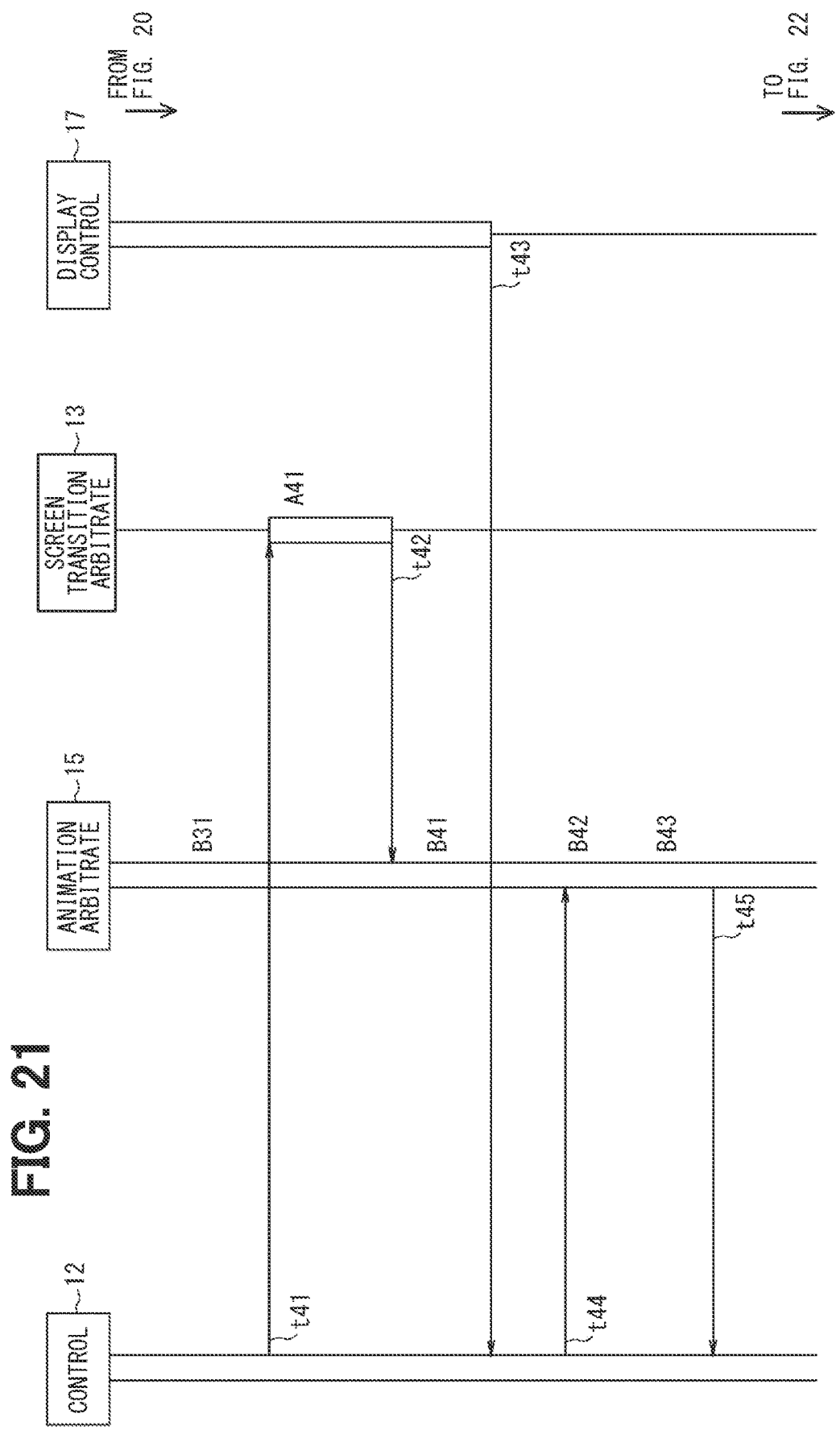
FIG. 21 is a diagram (No. 2) showing a sequence of processing for stacking waiting animations.
Figure 22:
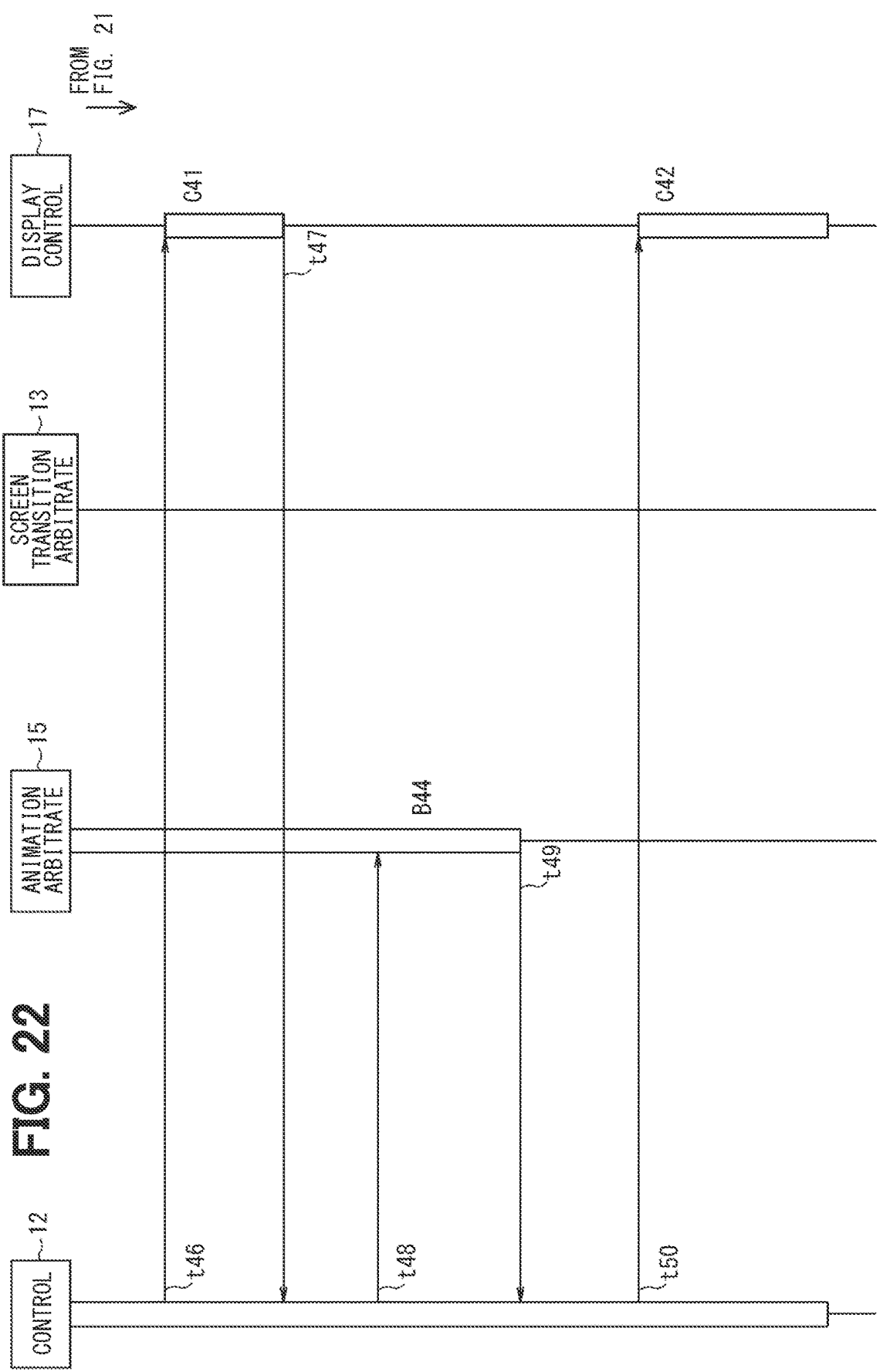
FIG. 22 is a diagram (No. 3) showing a sequence of processing for stacking waiting animations.

The stacking of waiting animations will be described with reference to FIG. 20, FIG. 21, and FIG. 22. The prerequisites and situations are as follows.

Prerequisite: Ring content 31 is being displayed in the ring center area.

Situation: When the engine is turned off by the ignition off while the above-mentioned ring content 31 is moving to the right, the left movement animation for the ring content 31, the right movement animation for the ring content 31, and the meter extinguishing animation are sequentially executed in the order of requests.

As described above with reference to FIG. 18 and FIG. 19, the animation arbitration unit 15 determines that the ring content 31 waits for the right movement. Thereafter, when the ignition off operation detection is received from the application in response to the user operating the ignition off, the control unit 12 outputs the ignition off operation detection to the screen transition arbitration unit 13 (t41). When the ignition off operation detection is received from the control unit 12, the screen transition arbitration unit 13 determines that there is no content assignment in the ring center area (A41). The screen transition arbitration unit 13 outputs the arbitration result to the animation arbitration unit 15, and notifies the animation arbitration unit 15 that the ring content 31 is to be deleted from the ring center area (t42).

When the arbitration result is received from the screen transition arbitration unit 13, the animation arbitration unit 15 determines that the meter extinguishing is made wait because the left movement animation for the ring content 31 is being executed (B41).

When the display control unit 17 ends the left movement animation for the ring content 31, the display control unit 17 outputs an animation end notification to the control unit 12 (t43). When the animation end notification is received from the display control unit 17, the control unit 12 outputs the animation end notification to the animation arbitration unit 15 (t44). When the animation end notification is received from the control unit 12, the animation arbitration unit 15 determines that the ring content 31 can be moved to the right (B42, corresponding to an animation arbitration step and an animation arbitration processing). The animation arbitration unit 15 determines that the meter extinguishing is continuously made to wait in order to execute the right movement for the ring content 31 (B43, corresponding to an animation arbitration step and an animation arbitration processing). The animation arbitration unit 15 then outputs the animation arbitration result to the control unit 12, and notifies the control unit 12 that the ring content 31 is moved from the ring side area to the ring center area by a slide animation (t45).

When the animation arbitration result is received from the animation arbitration unit 15, the control unit 12 outputs a right movement animation instruction of the ring content 31 to the display control unit 17 according to the received animation arbitration result (t46, corresponding to an execution instruction step and an execution instruction processing). When the right movement animation instruction of the ring content 31 is received from the control unit 12, the display control unit 17 executes the right movement animation for the ring content 31 according to the received right movement animation instruction and moves the ring content 31 to the right (C41).

When the right movement animation for the ring content 31 is ended, the display control unit 17 outputs an animation end notification to the control unit 12 (t47). When the animation end notification is received from the display control unit 17, the control unit 12 outputs the animation end notification to the animation arbitration unit 15 (t48). The animation arbitration unit 15 determines that meter extinguishing can be executed when the animation end notification is received from the control unit 12 (B44, corresponding to an animation arbitration step and an animation arbitration processing). The animation arbitration unit 15 outputs the animation arbitration result to the control unit 12, and notifies the control unit 12 that the ring content 31 is erased from the ring center area by a fade-out animation (t49).

When the animation arbitration result is received from the animation arbitration unit 15, the control unit 12 outputs a meter extinguishing instruction to the display control unit 17 (t50, corresponding to an execution instruction step and an execution instruction processing). When the meter extinguishing instruction is received from the control unit 12, the display control unit 17 executes the meter extinguishing according to the received meter extinguishing instruction.

From the above, by defining "wait", it is possible to define the interference rule between animations by relative comparison that specifies animations with higher priority than self. That is, even when a new animation is added due to a specification change, there is no need to redo the rule definition.

(3) "Block" Interference

"Block" interference will be described with reference to FIG. 23 and FIG. 24. "Block" interference is a rule definition that defines the "wait" specification, similar to the "wait" interference described above, and is a rule definition that makes the interrupt animation wait when an interrupt of the animation specified by "block" occurs while executing its own animation. Also in this case, the above-mentioned ring left movement animation, the ring right movement animation, and the meter extinguishing animation can be defined as shown in FIG. 23 as examples of the animation types and the transitions during animation execution. An example of a "block" interference rule definition can be defined as shown in FIG. 24. In FIG. 24, similar to FIG. 16, in the ring left movement animation and the ring right movement animation, which are inter-area movement animations, the target content is specified with "content:", the movement source area is specified with "from:", and the movement destination is specified with "to:". In this case, the ring left movement animation and the ring right movement animation specify the animation type "slide". Also, in the meter extinguishing animation, which is an in-area transition animation, the target area is specified with "area:", the transition source content is specified with "from:", and the transition destination content is specified with "to:". At this time, the meter extinguishing animation specifies the animation type "fade out". In addition, "block: ring right movement, meter extinguishing" is specified with the ring left movement, and "block: ring left movement, meter extinguishing" is specified with the ring right movement.

The sequence of the arbitration logic (movement animation, waiting and execution of interrupt animation, stacking of waiting animation) is the same as in FIGS. 17 to 22 shown in the above-mentioned "wait" interference.

From the above, by defining "block", it is possible to define the interference rule between animations by relative comparison that specifies animations with lower priority than self. That is, it is sufficient to define "block" in the animation having a high priority, and even when the specification is changed, the range of influence by the specification change can be limited to the animation having a high priority.

(Others)

As described in the above, according to the present embodiment, the following effects can be obtained.

In the display control apparatus 10, (i) the rule definition of the animation is memorized, (ii) the animation is arbitrated based on the rule definition of the animation, and (iii) the execution of the animation is instructed according to the arbitration result of the screen transition and the arbitration result of the animation. Unlike a known method of designing and managing animation arbitration specifications using matrix tables and state transition diagrams, animation arbitration is performed based on animation rule definitions. As a result, it is possible to flexibly respond to changes in content and changes in animation patterns, and it is possible to reduce the risk of errors occurring during implementation. As a result, it is possible to easily manage the execution control of the animation.

In the display control apparatus 10, the animation rule definition storage unit is configured to store the animation rule definition that specifies a movement source area, a movement destination area, and a target content in an inter-area movement animation. In the inter-area movement animation, the execution control of the animation can be easily managed by specifying the movement source area, the movement destination area, and the target content.

In the display control apparatus 10, the animation rule definition storage unit is configured to store the rule definition that specifies a transition source content, a transition destination content, and a target area in an intra-area transition animation. In the intra-area transition animation, the execution control of the animation can be easily managed by specifying the transition source content, the transition destination content, and the target area.

In the display control apparatus 10, the animation rule definition storage unit 16 is configured to store the rule definition canceling an animation as an interfering party by specifying "kickout" when the animation interferes. By specifying "kickout", it is possible to easily manage the execution control that cancels the animation as the interfering party.

In the display control apparatus 10, the animation rule definition storage unit 16 is configured to store the rule definition making an animation as an interfering party by specifying "block" when the animation interferes. By specifying "block", it is possible to easily manage the execution control that makes the animation as the interfering party wait.

In the display control apparatus 10, the animation rule definition storage unit 16 is configured to store the rule definition executing an animation as an interfering party and making an animation as an interfered party wait by specifying "wait" when the animation as the interfering party interferes with the animation as the interfered party. By specifying "wait", it is possible to easily manage the execution control that executes the animation as the interfering party and makes the animation as the interfered party wait.

Although the present disclosure has been described in accordance with embodiments, it is understood that the present disclosure is not limited to such embodiments or structures. The present disclosure incorporates various modifications and variations within a scope of equivalents. Additionally, various combinations and configurations, as well as other combinations and configurations including more, less, or only a single element, are within the scope and spirit of the present disclosure. The present disclosure may be applied not only to a vehicle but also to a content display control apparatus for purposes other than the vehicle.

The controllers such as the control unit 12, the screen transition arbitration unit 13, the animation arbitration unit 14, the display control unit 17, and methods thereof described in the above embodiment in the present disclosure may be each implemented by one or more than one special-purpose computer. Such a computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium. The computer program may be stored in a computer-readable non-transitional tangible recording medium as an instruction to be executed by the computer.

For reference to further explain features of the present disclosure, the description is added as follows.

For example, there are various kinds of contents displayed on a display device installed in a vehicle. Examples of such contents include a travel-related content that is related to a vehicle travel and a non-travel-related content that is not related to a vehicle travel. Examples of the travel-related content include a vehicle speed, an engine speed, a shift position, and a remaining amount of fuel. Examples of non-travel-related content include map information for navigation, audio information, and telephone information. A content is displayed in response to a display request of the content from an application. While a first content of a first application is being displayed, a display request of a second content may be generated from a second application. In such a case, the arbitration is performed as to which one of the first content and the second content is to be displayed with priority. For example, there is disclosed a method of arbitrating which content is to be displayed with priority.

In recent years, as the content display control has become complicated, the execution control of an animation in the screen transition has also become complicated. In a known method, it is necessary to determine an arbitration specification of how to behave when the next screen transition occurs during the execution of the animation. For example, it is necessary to determine (i) to continue to execute the previous animation as it is, skip the animation in the next screen transition and perform only the screen transition, or (ii) to wait for the animation in the next screen transition until the previous animation ends.

Up until now, such animation arbitration specifications are designed and managed using matrix tables and state transition diagrams. However, with this method of designing and managing animation arbitration specifications using matrix tables and state transition diagrams, it is necessary to extract content and animation patterns and analyze events individually, and it is difficult to flexibly respond to changes in content and animation patterns. In addition, since the matrix table and the state transition diagram become large-scale, there is a risk that an error may occur when implementing the animation even if the arbitration specifications can be managed.

Under these circumstances, it is thus desired for the present disclosure to provide an apparatus or a method that can easily manage the execution control of animation.

An aspect of the present disclosure described herein is set forth in the following clauses.

According to an aspect of the present disclosure, a content display control apparatus is provided to include an application storage unit, a screen transition rule definition storage unit, a screen transition arbitration unit, an animation rule definition storage unit, a display control unit, an animation arbitration unit, and an execution instruction unit. The application storage unit is configured to store applications. The screen transition rule definition storage unit is configured to store screen transition rule definitions. The screen transition arbitration unit is configured to arbitrate screen transitions, in response to a display request being output from the application, based on the screen transition rule definitions stored in the screen transition rule definition storage unit. The animation rule definition storage unit is configured to store animation rule definitions. The display control unit is configured to execute animations. The animation arbitration unit is configured to arbitrate the animations based on the animation rule definitions stored in the animation rule definition storage unit in response to receiving a screen transition arbitration result from the screen transition arbitration unit and an animation execution state from the display control unit. The execution instruction unit is configured to instruct the display control unit to execute the animations according to the screen transition arbitration result by the screen transition arbitration unit and an animation arbitration result by the animation arbitration unit.

That is, (i) the rule definitions of the animations are stored, (ii) the animations are arbitrated based on the rule definitions of the animations, and (iii) the execution of the animations is instructed according to the arbitration result of the screen transitions and the arbitration result of the animations. Unlike the known method of designing and managing animation arbitration specifications using matrix tables and state transition diagrams, animation arbitration is performed based on animation rule definitions. As a result, it is possible to flexibly respond to changes in contents and changes in animation patterns, and it is possible to reduce the risk of errors occurring during implementation. As a result, it is possible to easily manage the execution control of the animations.

What is claimed is:

1. A content display control apparatus including:
(i) an application storage unit configured to store applications,
(ii) a screen transition rule definition storage unit configured to store screen transition rule definitions to control assigning content to display in an area of a display area and displaying the content in the area of the display area, and
(iii) a screen transition arbitration unit configured to arbitrate screen transitions to prioritize which content is assigned to the area, in response to a display request being output from one of the applications, based on the screen transition rule definitions stored in the screen transition rule definition storage unit,
the content display control apparatus comprising:
an animation rule definition storage unit configured to store screen transition animation rule definitions;
a display control unit configured to execute screen transition animations;
a screen transition animation arbitration unit configured to arbitrate the screen transition animations to decide which screen transition animation to execute based on the screen transition animation rule definitions stored in the animation rule definition storage unit in response to receiving a screen transition arbitration result from the screen transition arbitration unit and an animation execution state from the display control unit; and
an execution instruction unit configured to instruct the display control unit to execute the screen transition animations according to the screen transition arbitration result by the screen transition arbitration unit and an animation arbitration result by the animation arbitration unit;
wherein the animation rule definition storage unit is configured to store a screen transition animation rule definition that cancels a new screen transition animation as an interfering party when the new screen transition animation is not registered in an action queue that manages generated screen transition animations and interferes with a screen transition animation that is registered in the action queue.

2. The content display control apparatus according to claim 1, wherein:
the animation rule definition storage unit is configured to store the screen transition animation rule definition that specifies a movement source area, a movement destination area, and a target content which is content to be assigned to the area, in an inter-area movement animation moving between the areas.

3. The content display control apparatus according to claim 1, wherein:
the animation rule definition storage unit is configured to store the screen transition animation rule definition that specifies a transition source content which is content to be assigned to the area of the transition source, a transition destination content which is the content to be assigned to the area of the transition destination, and a target area in an intra-area transition animation transitioning within the area.

4. A content display control apparatus including:
(i) an application storage unit configured to store applications,
(ii) a screen transition rule definition storage unit configured to store screen transition rule definitions to control assigning content to display in an area of a display area and displaying the content in the area of the display area, and
(iii) a screen transition arbitration unit configured to arbitrate screen transitions to prioritize which content is assigned to the area, in response to a display request being output from one of the applications, based on the screen transition rule definitions stored in the screen transition rule definition storage unit,
the content display control apparatus comprising:
an animation rule definition storage unit configured to store screen transition animation rule definitions;
a display control unit configured to execute screen transition animations;
a screen transition animation arbitration unit configured to arbitrate the screen transition animations to decide which screen transition animation to execute based on the screen transition animation rule definitions stored in the animation rule definition storage unit in response to receiving a screen transition arbitration result from the screen transition arbitration unit and an animation execution state from the display control unit; and
an execution instruction unit configured to instruct the display control unit to execute the screen transition animations according to the screen transition arbitration result by the screen transition arbitration unit and an animation arbitration result by the animation arbitration unit;

wherein: the animation rule definition storage unit is configured to store an animation rule definition that causes a new screen transition animation being executed later serving as an interfering party to wait when the new screen transition animation is not registered in an action queue that manages generated screen transition animations and interferes with a screen transition animation that is registered in the action queue.

5. A content display control apparatus including:
(i) an application storage unit configured to store applications,
(ii) a screen transition rule definition storage unit configured to store screen transition rule definitions to control assigning content to display in an area of a display area and displaying the content in the area of the display area, and
(iii) a screen transition arbitration unit configured to arbitrate screen transitions to prioritize which content is assigned to the area, in response to a display request being output from one of the applications, based on the screen transition rule definitions stored in the screen transition rule definition storage unit,
the content display control apparatus comprising:
an animation rule definition storage unit configured to store screen transition animation rule definitions;
a display control unit configured to execute screen transition animations;
a screen transition animation arbitration unit configured to arbitrate the screen transition animations to decide which screen transition animation to execute based on the screen transition animation rule definitions stored in the animation rule definition storage unit in response to receiving a screen transition arbitration result from the screen transition arbitration unit and an animation execution state from the display control unit; and
an execution instruction unit configured to instruct the display control unit to execute the screen transition animations according to the screen transition arbitration result by the screen transition arbitration unit and an animation arbitration result by the animation arbitration unit;
wherein the animation rule definition storage unit is configured to store an animation rule definition that causes a screen transition animation being executed later serving as an interfered party to wait and executes a new screen transition animation serving as an interfering party when the new screen transition animation that is not registered in the action queue that manages generated screen transition animations and interferes with the screen transition animation that is registered in the action queue.

\* \* \* \* \*